(12) United States Patent
Perlman

(10) Patent No.: US 9,923,677 B2
(45) Date of Patent: Mar. 20, 2018

(54) MULTIPLEXING MANY CLIENT STREAMS OVER A SINGLE CONNECTION

(71) Applicant: Intel Corporation, Santa Clara, CA (US)

(72) Inventor: Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 14/583,337

(22) Filed: Dec. 26, 2014

(65) Prior Publication Data

US 2016/0191672 A1    Jun. 30, 2016

(51) Int. Cl.
*H04L 29/06*  (2006.01)
*H04L 12/46*  (2006.01)
(Continued)

(52) U.S. Cl.
CPC ........ *H04L 5/0001* (2013.01); *H04L 12/4633* (2013.01); *H04L 69/161* (2013.01);
(Continued)

(58) Field of Classification Search
CPC . H04L 69/161; H04L 12/4633; H04L 5/0001; H04L 67/02; H04L 67/28; H04L 67/2842
(Continued)

(56) References Cited

U.S. PATENT DOCUMENTS 7,013,338 B1 * 3/2006 Nag ................. H04L 29/06027
709/226
7,839,873 B1 * 11/2010 Quach ..................... H04L 47/10
370/389

(Continued)

FOREIGN PATENT DOCUMENTS

JP    11-298526 A    10/1999
JP    2002-185488 A   6/2002

OTHER PUBLICATIONS

Office Action received for Japanese Patent Application No. 2015-228864, dated Nov. 15, 2016, 4 pages of Japanese Office Action including 2 pages of English Translation.

(Continued)

*Primary Examiner* — Mark Rinehart
*Assistant Examiner* — Kenneth P Hunt
(74) *Attorney, Agent, or Firm* — Law Offices of R. Alan Burnett, P.S

(57) ABSTRACT

Methods and apparatus for multiplexing many client streams over a single connection. A proxy server establishes multiple TCP connections with respective clients that desire to access a web server connected to the proxy server via a multiplexed TCP connection. TCP packets received from the clients via the TCP connections are separated out based on their TCP connections, a packet payload data is extracted and added to client data streams. Data segments comprising sequential runs of bits from the client data streams and embedded in multiplexed (MUX) TCP packets that are sent over the multiplexed TCP connection. Upon receipt, the web server de-encapsulates the data segments and buffers them in queues allocated for each TCP connection in re-assembled client data streams. This enables the packet flows transported over the multiplexed connection for the TCP connections to be individually controlled. The multiplexed TCP connection may also be used for forwarding packet payload data generated at the web server to the clients via the proxy server and the client's TCP connections.

25 Claims, 15 Drawing Sheets

(51) Int. Cl.
*H04L 29/08* (2006.01)
*H04L 5/00* (2006.01)

(52) U.S. Cl.
CPC ............ *H04L 69/163* (2013.01); *H04L 67/02* (2013.01); *H04L 67/28* (2013.01); *H04L 67/2842* (2013.01)

(58) Field of Classification Search
USPC .......................................................... 370/474
See application file for complete search history.

(56) References Cited

U.S. PATENT DOCUMENTS

| | | | | |
|---|---|---|---|---|
| 8,090,866 | B1* | 1/2012 | Bashyam | H04L 69/16 709/212 |
| 2002/0052931 | A1* | 5/2002 | Peiffer | H04L 29/06 709/218 |
| 2002/0146016 | A1* | 10/2002 | Liu | H04L 69/16 370/401 |
| 2007/0036174 | A1* | 2/2007 | Aris | H04L 12/2856 370/466 |
| 2008/0304486 | A1* | 12/2008 | Graessley | H04L 65/608 370/392 |
| 2011/0066718 | A1* | 3/2011 | Susai | H04L 29/06 709/224 |
| 2011/0164589 | A1* | 7/2011 | Lee | H04W 36/02 370/331 |
| 2012/0054316 | A1 | 3/2012 | Piazza et al. | |
| 2012/0054851 | A1* | 3/2012 | Piazza | H04L 63/0209 726/12 |
| 2012/0063493 | A1* | 3/2012 | Hasegawa | H04L 47/724 375/211 |
| 2012/0093150 | A1* | 4/2012 | Kini | H04L 45/24 370/389 |
| 2012/0151087 | A1* | 6/2012 | Azam | H04L 69/04 709/233 |
| 2014/0006481 | A1* | 1/2014 | Frey | H04L 41/0246 709/203 |
| 2014/0207845 | A1* | 7/2014 | Han | H04L 47/283 709/203 |
| 2015/0256493 | A1* | 9/2015 | Wilson | H04L 51/08 709/206 |

OTHER PUBLICATIONS

Office Action received for Japanese Patent Application No. 2015-228864, dated Jun. 20, 2017, 5 pages of Japanese Office Action including 3 pages of English Translation.

Belshe, et al., "Hypertext Transfer Protocol", draft-ietf-httpbis-http2-16, Version 2, Nov. 29, 2014, 92 pages.

Terai, et al., "Design and Evaluation of Dynamic Resource Management Scheme for High-Performance Web Proxy Servers", The Institute of Electronics Information and Communication Engineers, IN2001-165, vol. 101, No. 639, Feb. 7, 2002, p. No. 25-32, 8 pages. (English Abstract Included).

* cited by examiner

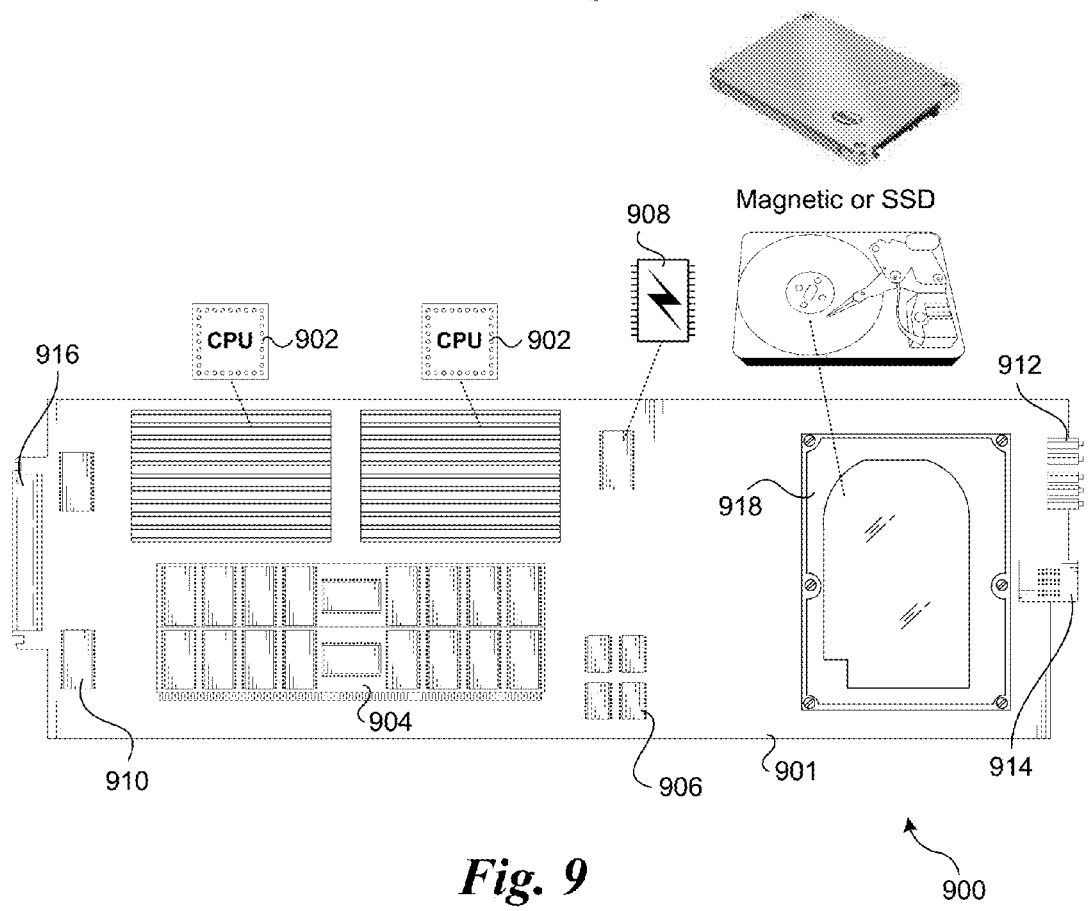

MULTIPLEXING MANY CLIENT STREAMS OVER A SINGLE CONNECTION

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, and addition to the deployment of massive data centers to support these services which employ private network infrastructure. Additionally, the new generation (i.e., 4G) of mobile network data services is expected to significantly impact the utilization of land-line networks in the near future. The result of these and other considerations is that the utilization of computer networks is expected to continue to grow at a high rate for the foreseeable future.

Much of Internet traffic employs the HyperText Transport Protocol (HTTP) or HTTPS (an encrypted and secured version of HTTP). Fundamentally, HTTP involves a communication between a client (e.g., a web browser on a user device) and an HTTP server (e.g., a web server application running on a server hosting and/or providing access to a web site; as used herein, the terms "web" server and HTTP server may be used interchangeably). HTTP functions as a request-response protocol in the client-server computing model. Under a typical HTTP request-response sequence, a client submits an HTTP request message to the server. The server, which provides resources such as HTML files and other content, or performs other functions on behalf of the client, returns a response message to the client.

FIG. 1 shows an Internet architecture 100 illustrating selected Internet components, including network elements, client devices, servers, and services. The Internet, commonly depicted as an Internet cloud 102, is a massive collection of interconnected networking elements, including gateways 104 and switches 106, which are interconnected by links 108. Client devices ("clients," recognizing a client may be referring to the device itself or an application running on the device), depicted by mobile phones (clients 110 and 112), a tablet (client 114, a desktop computer (client 116), and laptops (clients 118 and 120) are typically connected to Internet 102 via a gateway 104 that is operated by an Internet Service Provider (ISP) or a mobile service provider (when accessing the Internet via a mobile network). For simplicity and to avoid clutter, the connections between the client devices and a gateway are shown as a double-headed arrow; in practice, there are various networking elements between the client devices and the gateways, and the functionality ascribed to a gateway may be implemented on one or more network elements.

Various servers are also connected to Internet 102, as depicted by a web server 122 and a third-party e-mail server 124. Web server 122 provides the "frontend" access to a website 126. Larger websites, such as search sites, news sites and ecommerce sites, may have dozens, hundreds, or even thousands web servers to handle the website's traffic. Third-party e-mail server 124 is a conceptual entity that in practice may be implemented via multiple web servers in a frontend tier that are coupled to e-mail application servers or the like in one or more "middle" tiers, which in turn are connected to data stores in a "backend" tier. Large third-party e-mail services, such as Microsoft Hotmail, Google Gmail, and Yahoo Mail are implemented using large data centers (also referred to as server farms), as depicted by a data center 128.

To facilitate HTTP/HTTPS communication between a client and server, a TCP (Transmission Control Protocol) connection is first established. TCP is one of the core protocols of the Internet protocol suite (IP), and a TCP connection is also sometimes referred to as TCP/IP connection. TCP uses the IP addresses of a pair of TCP endpoints (e.g., a client and a server), which respectively comprise the IP addresses allocated to the client and server that are linked in communication over the TCP connection.

While TCP provides a reliable transport protocol, it does not define how TCP/IP packets are to be routed between a client and server. For example, there are two multi-hop paths (one in solid lines, the other in dashed lines) illustrated in FIG. 1 between the gateway connected by client 110 and the gateway connected to web server 122. While packet "flows" for some classes of traffic may be forwarded along a given path, the majority of Internet traffic is forwarded hop-to-hop on a best efforts basis, under which the forwarding path for a packet is not predefined.

A given HTTP server may support 1000's of concurrent TCP connections, each with a different client TCP endpoint. This creates a great deal of overhead, such as timeout timers and separate byte sequence number spaces for each client connection. In addition, each HTTP servers has a finite bandwidth limit, which may result in packets being dropped at the HTTP server. While TCP supports congestion control, its congestion control mechanisms are implemented on the individual TCP connections, and not managed collectively as a function of the server's workload.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2b is a link connection diagram illustrating further details of individual TCP connections and the multiplexed TCP connection of FIG. 2a;

FIG. 4a' is a schematic diagram illustrating an optional configuration for processing multiplexed TCP packet data segments received over a multiplexed TCP connection at a proxy server under which re-assembled TCP packets are loaded into a packet output buffer;

FIG. 8b is a rear isometric view of the blade server chassis of FIG. 8a;

FIG. 8c is an isometric frontal view of an exemplary blade server rack in which a plurality of rack-mounted blade server chassis corresponding to FIGS. 8a and 8b are installed; and FIG. 9 shows details of the components of a typical server blade, according to one embodiment.

DETAILED DESCRIPTION

Figure 1:
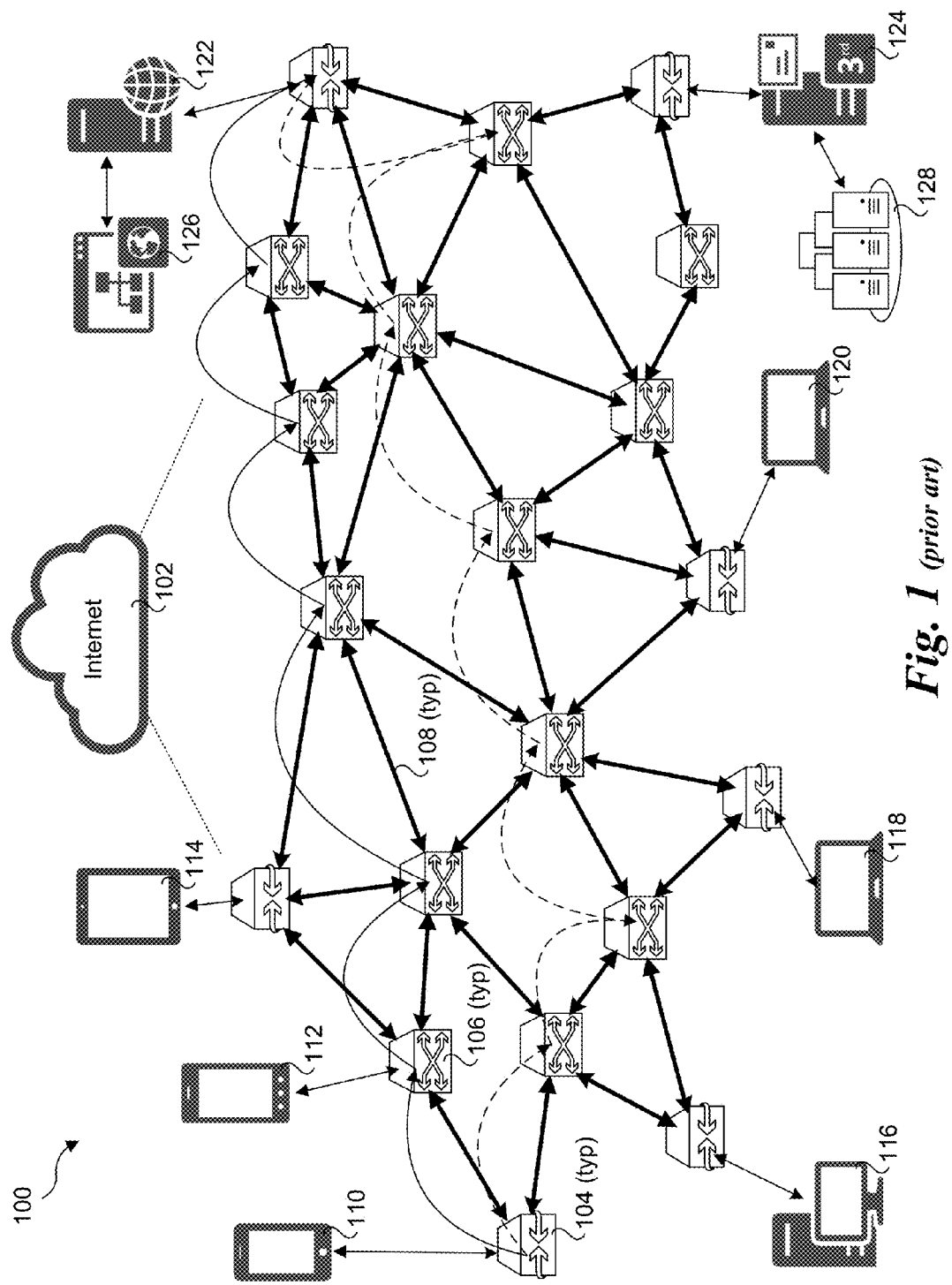
FIG. 1 is a schematic diagram illustrating an architectural view of selected components of the Internet.

Embodiments of methods and apparatus for multiplexing many client streams over a single connection are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, techniques are disclosed for implementing multiplexed TCP connections under which communications from multiple clients are transported over a single TCP connection. This greatly reduces the overhead required for maintaining individual TCP connections for each client. Moreover, novel flow control techniques are also provided that enable individual flows corresponding to client TCP traffic within the multiplexed TCP connection to be handled as if an individual TCP connection between the client and server was being used.

One aspect of the multiplexed TCP implementation is the use of a proxy server that communicates directly with the clients using individual TCP connections. In addition to supporting client-server communication, HTTP is designed to permit intermediate network elements to improve or enable communications between clients and servers. High-traffic websites often benefit from web cache servers that deliver content on behalf of upstream servers to improve response time. In addition, HTTP proxy servers at private network boundaries can facilitate communication for clients without a globally routable address, by relaying messages with external servers. Proxy servers are also widely used by large websites, such as those hosted by Google and Amazon.

Figure 2A:
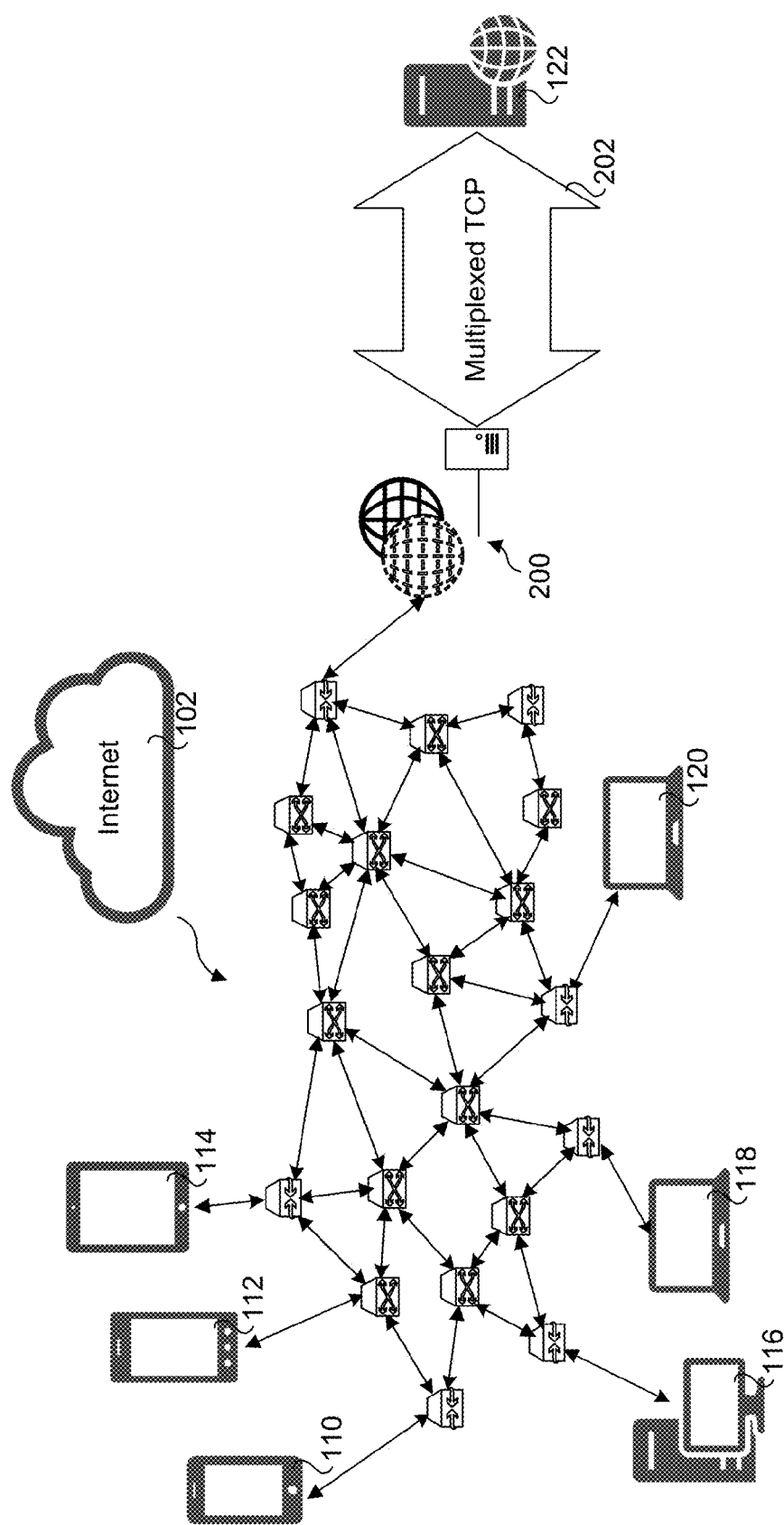
FIG. 2a is a schematic diagram illustrating an exemplary network configuration employing a multiplexed TCP connection between a proxy server and a web server.
Figure 2B:
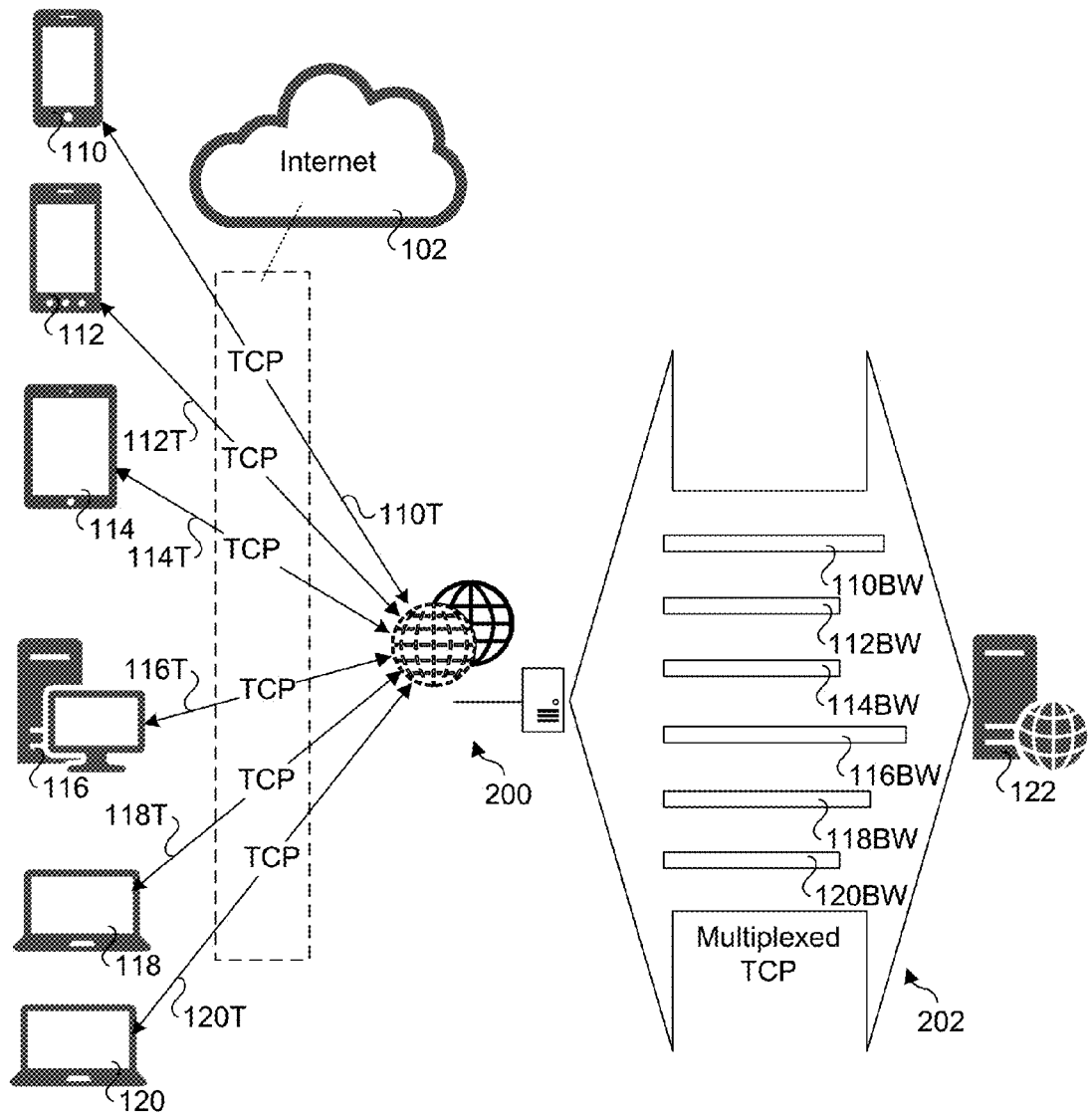

FIGS. 2a and 2b respectively show a network architecture and link connection diagram used to illustrated aspects of an exemplary multiplexed TCP connection implementation, under which clients communicate over individual TCP connections with a proxy server 200, which is configured to forward corresponding HTTP traffic via a multiplexed connection 202 between proxy server 200 and web server 122. As before, clients 110, 112, 114, 116, 118 and 120 are connected to Internet 102 via ISP or mobile service provider facilities, such as Internet gateways or the like. Each of these clients desires to establish an HTTP connection with web server 122. This would typically be accomplished by users of the client devices entering the URL (Uniform Resource Locator) of the website web server 122 is associated with, e.g., www dot Amazon dot com. Since clients and servers on the Internet use IP addresses (e.g., IPv4 or IPv6), the URLs need to be translated into a corresponding IP address. The mapping between URLs and IP addresses is facilitated by a Domain Name Server (DNS). For large sites such as Amazon and Google, it would be impossible to use a single server with a single IP address to handle client traffic. In some cases, proxy servers are used to address this problem. Under a typical proxy server scheme, rather than return the IP address for the web server nominally associated with the URL, the network address provided by the DNS lookup returns the address of the proxy server instead.

As shown in FIG. 2b, each of clients 110, 112, 114, 116, 118 and 120 is connected to proxy server 200 via a respective TCP connection 110T, 112T, 114T, 116T, 118T, and 120T. Under a conventional proxy server usage, the proxy server would maintain a respective TCP connection with the web server for each client connection. Under one common approach, the proxy server merely changes the source and destination IP addresses in the TCP/IP headers, and forwards the original packets (absent the changes in the source and destination addresses). From the perspective of the clients and the web server, the existence of the proxy server is transparent, meaning they are completely unaware that a proxy server is being used.

The conventional proxy server approach still necessitates an individual TCP connection that is maintained for each client communicating with the web server. In contrast, under the embodiment illustrated in FIGS. 2a and 2b, the TCP traffic transported over TCP connections 110T, 112T, 114T, 116T, 118T, and 120T is divided into client data segments that are multiplexed between proxy server 200 and web server 122 using multiplexed TCP connection 202. One aspect of implementing a multiplexed TCP connection is allocation and operation of various buffer queues to handle the traffic for each TCP flow between a client device and the server. Additionally, a flow management scheme is implemented in association with these queues to allocate a respective portion of the multiplexed TCP connection's bandwidth, as depicted by bandwidth allocations 110BW, 112BW, 114BW, 116BW, 118BW, and 120BW.

Figure 2C:
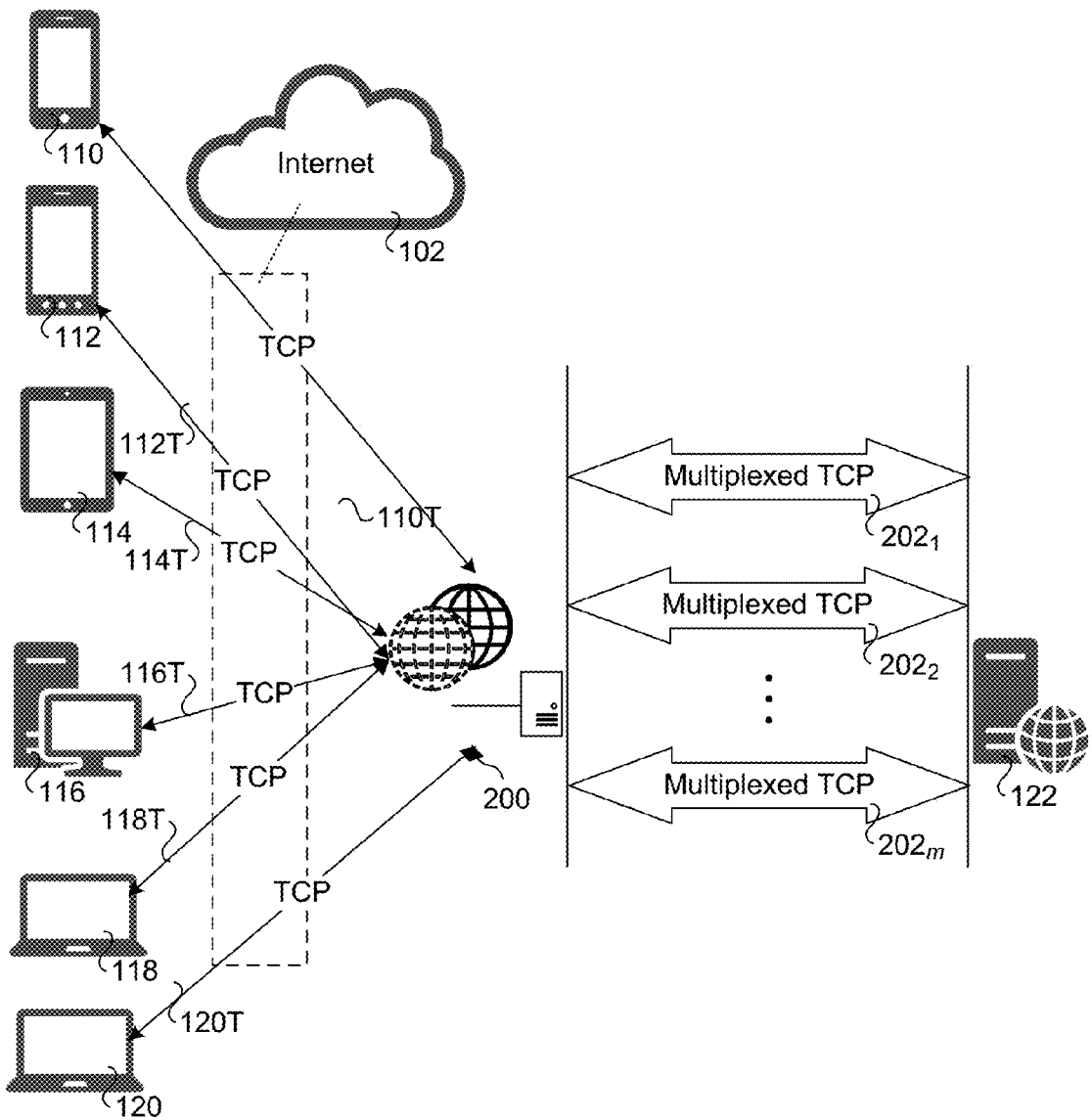
FIG. 2c is a link connection diagram illustrating an optional configuration to FIG. 2b under which a proxy server is connected to a web server via multiple multiplexed TCP connections.

FIG. 2c is a link connection diagram illustrating an optional configuration to FIG. 2b under which proxy server 200 is connected to web server 122 via m multiplexed TCP connections 202$_1$, 202$_2$, 202$m$. Depending on the number of incoming TCP connections (i.e., from clients to the proxy server), there may be diminished returns as the number of TCP connections increases. It is further recognized the each of a proxy server and web server will typically have multiple network ports, each allocated a separate IP address and capable of being a TCP endpoint. Accordingly, there are situations in which it will be advantageous to implement multiple multiplexed TCP connections between a proxy server and a web server operating in parallel.

Figure 2D:
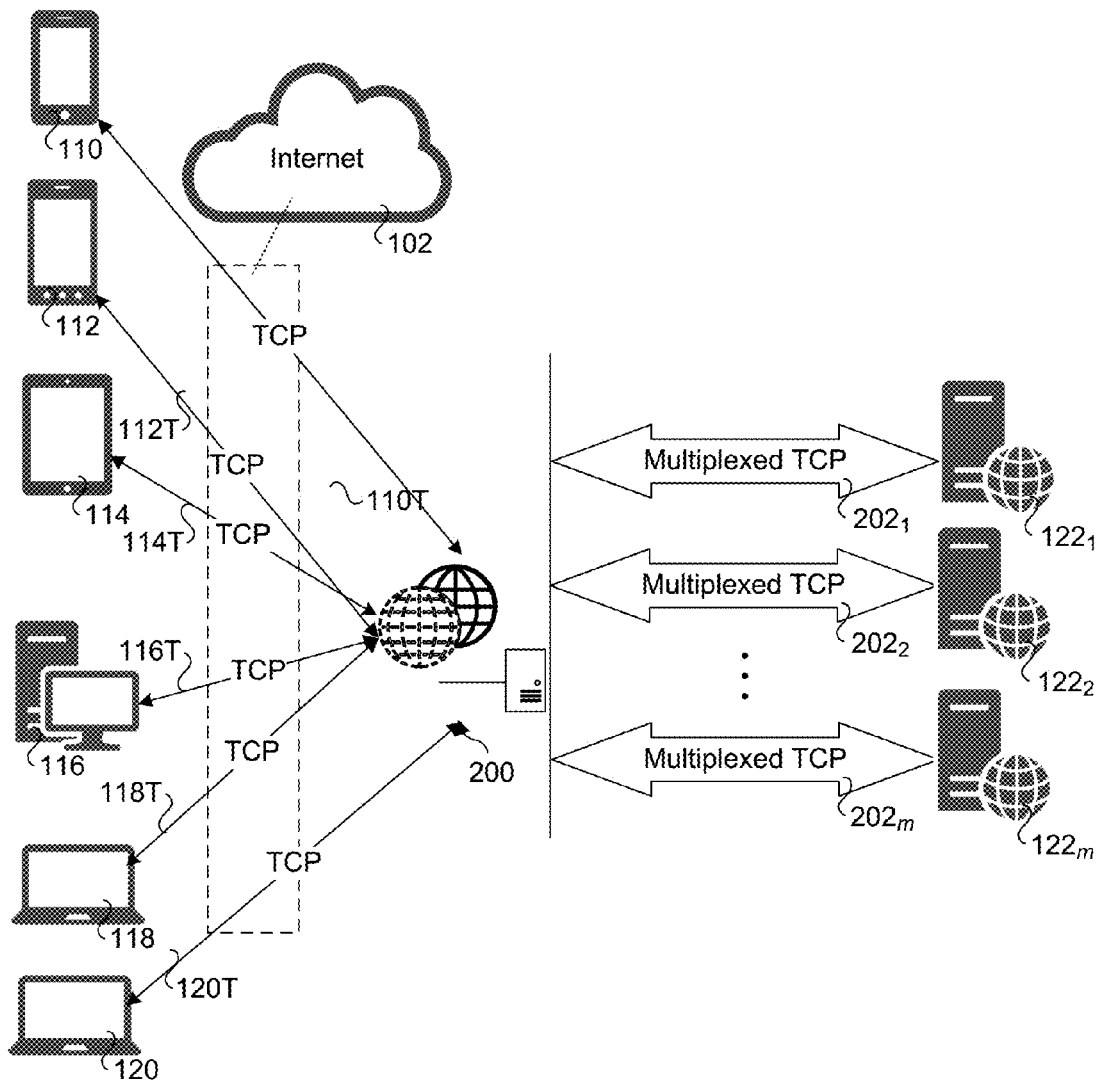
FIG. 2d is a link connection diagram illustrating an optional configuration to FIG. 2b under which a proxy server is used for as a proxy for multiple web servers, with a separate multiplexed TCP connection between the proxy and each web server.

FIG. 2d is a link connection diagram illustrating another optional configuration to FIG. 2b under which proxy server 200 is used for as a proxy for k web servers 122$_1$, 1222$_2$, 122$k$, with a separate multiplexed TCP connection between the proxy and each web server. Since the workload of a proxy server will typically be less than that of a web server (on a per-client connection basis), there may be implementation environments in which it will be advantageous to employ a proxy server that operates as a proxy for multiple web servers. In addition to the configurations illustrated in FIGS. 2b, 2c and 2d, other configuration may be implemented that connect a proxy server to a web server using a multiplexed TCP connection.

Figure 3A:
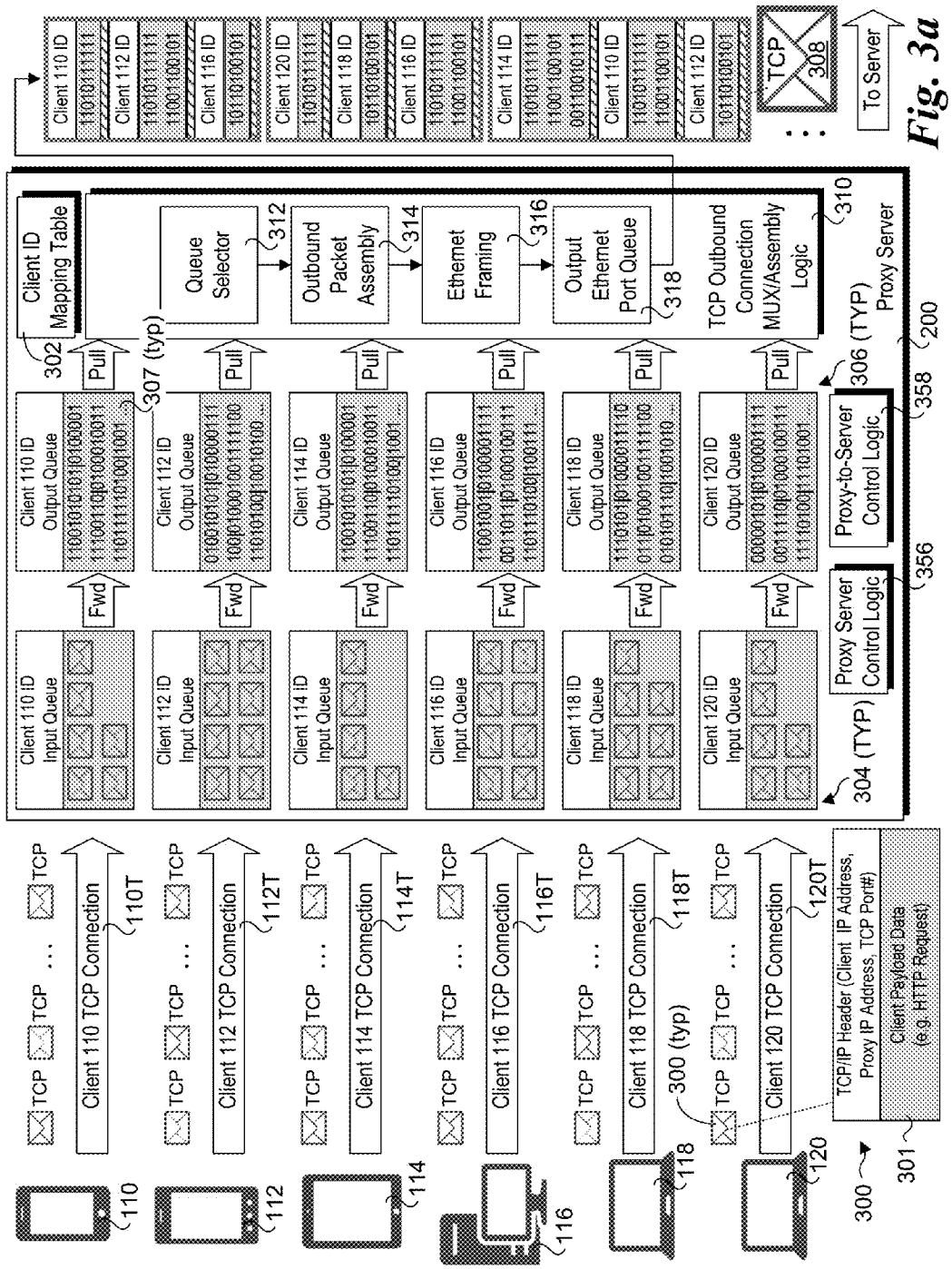
FIG. 3a is a schematic diagram illustrating TCP packet segment data forwarding components implemented by a proxy server in connection with forwarding TCP packets received from clients to a web server via a multiplexed TCP connection transferring data segments, according to one embodiment.

FIG. 3a schematically depicts handling and forwarding operations performed by proxy server 200 in connection with inbound TCP packets received from clients 110, 112, 114, 116, 118 and 120, according to one embodiment. The first set of processing operations is similar to those performed by a conventional TCP endpoint supporting multiple TCP connections. As illustrated, a sequence of TCP packets 300, transported from a given client device over a corresponding TCP connection that is established between the client device and proxy server 200. Streams of packets are depicted in FIG. 3a for illustrative purposes—for a give HTTP request or response, a client may send one or more TCP packets to the web server; over time, this may appear (from the perspective of a receiving device) as a stream of packets, while noting that typically HTTP traffic that is not related to multimedia content will employ a stateless HTTP connection rather than a streaming connection. Moreover, much HTTP traffic from a client may consist of relatively small HTTP requests, which often may be transported in a single TCP packet. Each TCP packet 300 includes packet payload data 301, such as an HTTP request.

By way of illustration, each of clients 110, 112, 114, 116, 118 and 120 is depicted as sending a sequence of packets over a respective TCP connection 110T, 112T, 114T, 116T, 118T, and 120T. To support a TCP connection, a TCP port (a software port, not a physical port) is opened at each end of the TCP connection, such that each TCP connection (from the perspective of proxy server 200) may be identified by a combination of the IP address of the client and the TCP port number. (It is noted that a given client may establish multiple concurrent TCP connections with a server if multiple TCP ports are used.) In one embodiment, a client ID (identifier) mapping table 302 is used by proxy server 200 to map client IP address/TCP port number combinations to associated client ID values. For illustrated purposes, in the Figures herein the client IDs are indicated by "Client"+the client's reference number+"ID", e.g., Client 110 ID is the client ID for client 110 (when using TCP connection 110T).

As with a conventional TCP endpoint architecture, an input queue 304 is allocated for each TCP connection (as identified by the client ID in FIG. 3a). A TCP connection input queue (which also may be referred to as a buffer), is used to temporarily buffer packets as the packets are received and reorder any out-of-order packets using the TCP byte sequence data in the packet's TCP headers. In addition, TCP employs a mechanism for detecting dropped packet, and any dropped packet will need to be retransmitted from the TCP source (a client in this example). For simplicity and convenience, input queues 304 are depicted as a respective single queue for each TCP connection. In practice, they may be implemented using one or more buffers or queues implemented in memory on the TCP endpoint. Generally, depending on the network adapter architecture, an input queue may be implemented via a software layer (e.g., a TCP layer in a software networking stack), or it may be handled by embedded logic in the network adaptor or a combination of the two.

When a sequential run of TCP packets has been detected in an input queue 304, all or a portion of the sequential run is forwarded (Fwd) into an output queue 306 associated with the TCP port. Alternatively, an output queue 306 may be configured to "pull" sequential runs of packets from an associated input queue 304. In one embodiment, each of output queues 306 will hold a sequential run of packet payload data that were sent over a particular TCP-client connection. Moreover, in one embodiment these TCP/IP headers are stripped from the packet payload data and payload delineation markers are added to the bitstream, as depicted by client data streams 307, wherein the pipe symbol '|' between runs of bits represents a delineation between packet payload data. Under an alternative scheme, the TCP/IP headers and remain in the client data streams, but are stripped out and ignored during subsequent processing by web server 122.

Figure 5:
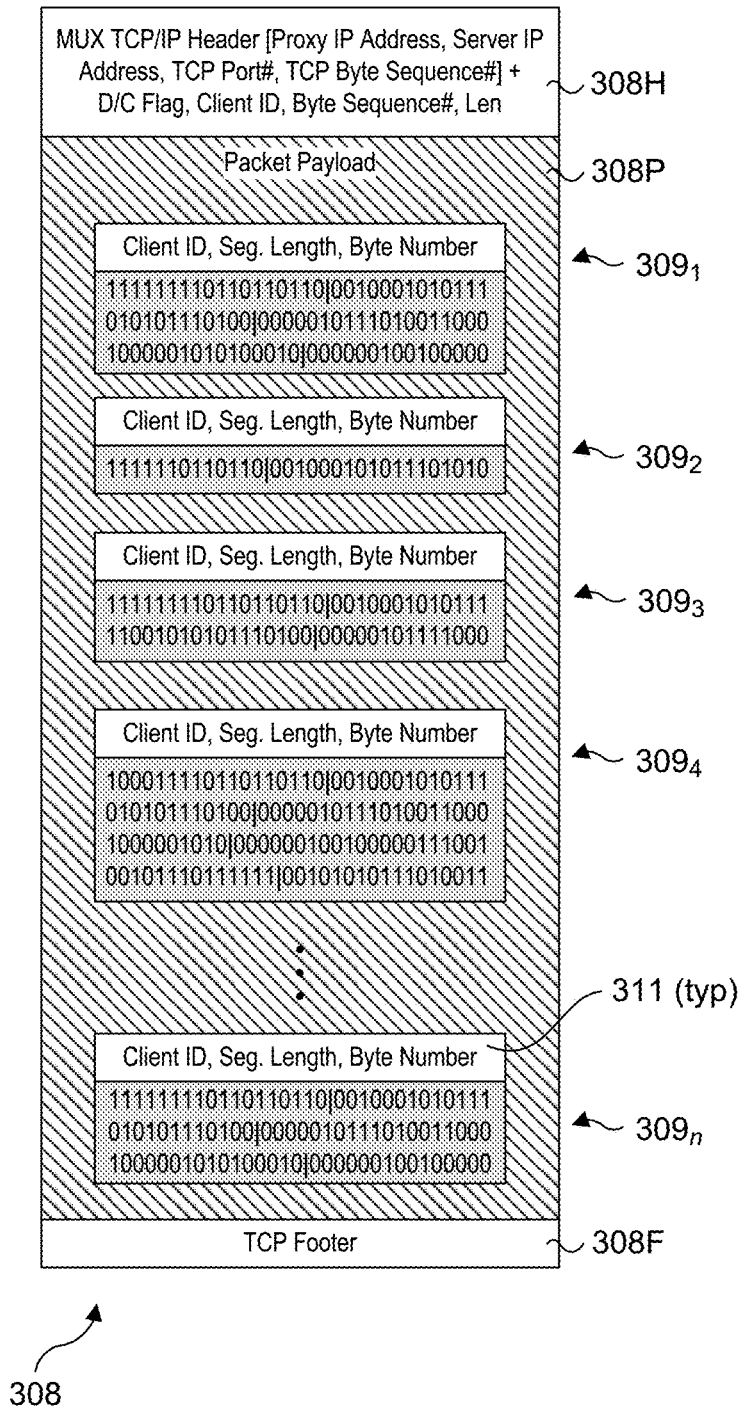
FIG. 5 is a block diagram illustrating one embodiment of a multiplexed TCP packet.

In one embodiment, sequential runs of the bitstreams comprises segments of data (data segments) are multiplexed (MUX) in TCP packets 308 that are configured to be transmitted between proxy server 200 and web server 122. The term "MUX TCP" used here is to distinguish these packets from the TCP packets 300 received from the clients—structurally, the MUX TCP packets comprise conventional TCP packets that include embedded header information for facilitating data segment handling in connection with transport over the multiplexed TCP connection, further details of which are illustrated in FIG. 5 and discussed below. Preferably, MUX TCP packets 308 are as large as possible, thus reducing the relative bandwidth overhead lost to encapsulation. For example, in one embodiment Jumbo TCP packets and Jumbo Ethernet frames are used. In addition, the size of MUX TCP packets may vary to accommodate the collective size of their encapsulated data segments. Padding may also be implemented in the MUX TCP packets, as applicable.

In one embodiment, data segments comprising sequential runs of bitstream data corresponding to the TCP packet payload data received from clients 110, 112, 114, 116, 118 and 120 are encapsulated and sent over multiplexed TCP connection 202 in the following manner. Proxy server 200 includes TCP outbound stream MUX and assembly logic 310 including a queue selector 312, an outbound packet assembly block 314, an Ethernet framing block 316, and an output Ethernet port queue 318. As discussed above, each of client output queues 306 will contain a sequential run of TCP packet payload bitstream data (unless a particular queue has been emptied). Also as discussed above with reference to FIG. 2b, each of clients 110, 112, 114, 116, 118 and 120 receives a respective bandwidth allocation 110BW, 112BW, 114BW, 116BW, 118BW, and 120BW.

The bandwidth allocation is managed by queue selector 310 (in combination with logic on both proxy server 200 and web server 122, as described below), which selects which client output queues 306 to pull data segments from to be encapsulated in a given TCP packet 308. Various types of selection algorithms may be employed, such as round robin, weighted or non-weighted fair queuing, selection based on queue fill levels, etc. The bandwidth slice allocated to the clients may be dynamically changed in view of changes in traffic patterns and other consideration. It is additionally noted that when new client TCP connections between newly-connected clients and proxy server 200 are established, client input queues 304 and client output queues 306 are dynamically allocated. Similarly, when a TCP connection is detected to have been closed, the corresponding buffer space allocated for the client input queue 304 and client output queue 306 associated with that TCP connection are released to be re-allocated for a new TCP connection.

The sequential run of bits comprising data segments pulled from a client output buffer 306 by queue selector 312 are encapsulated into a MUX TCP packet 308 by outbound packet assembly block 314. In one embodiment, multiplexed TCP connection 202 is operated as a conventional TCP connection as applied to MUX TCP packets 308 transferred between proxy server 202 and web server 122. However, both the generation of the packet stream at proxy server 200 and handling of the received packet stream at web server 122 use non-conventional techniques.

FIG. 5 illustrates one embodiment of a MUX TCP packet 308, which includes a MUX TCP/IP header 308H, followed by a packet payload 308P, including n encapsulated data segments $309_1 \ldots 309_n$, followed by a TCP footer 308F. In one embodiment, MUX TCP/IP header 308H comprises conventional TCP/IP header fields shown in brackets including Source and Destination IP addresses for proxy server 200 and web server 122, TCP byte sequence number, etc., plus some additional parameters that may be added to optional fields in the TCP/IP header. In one embodiment the parameters include a data/control flag, a client ID, a byte sequence number, and a length (Len). The parameters may be embedded in individual fields, and/or may be encoded such that they may be embedded in a lesser number of fields, including a single field. As another option, the parameters may be encoded in a parameter string or the like that is located at the beginning of packet payload 308P. In the illustrated embodiment, each of data segments $309_1 \ldots 309_n$, includes a header 311 comprising a client ID, a segment length, and a byte (sequence) number. Optional delimiter data may be added at the end of each data segment 309, similar to the delimiter data used to separate Ethernet frames (e.g., a predetermined bit sequence such as a string of 1's or 0's). The byte sequence number is used to reorder the byte sequence in the bitstream in the event a MUX TCP packet 308 is dropped and needs to be re-sent.

One or more MUX TCP packets 308 are encapsulated in an Ethernet frame in Ethernet framing block 316 in the conventional manner. Preferably, Jumbo Ethernet frames may be used to reduce bandwidth lost due to Ethernet framing overhead. The Ethernet frames are then queued in output Ethernet port queue 318 and subsequently streamed to server 122.

Figure 3B:
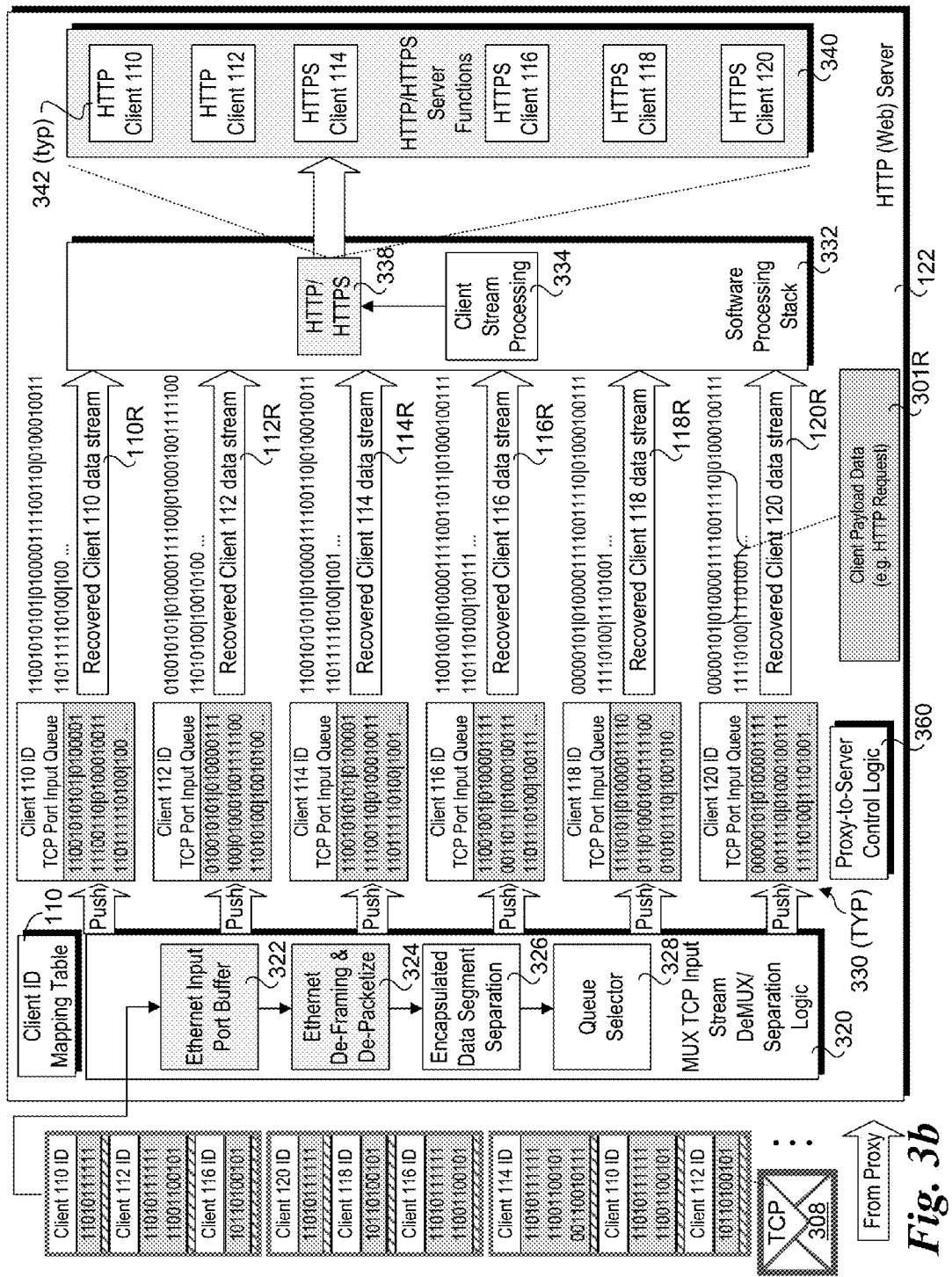
FIG. 3b is a schematic diagram illustrating server-side components implemented by a web server in connection with processing TCP packet data segments received from a proxy server via a multiplexed TCP connection, according to one embodiment.

FIG. 3b illustrates how MUX TCP packets 308 received from proxy server 200 over multiplexed TCP connection 202 are processed on web server 122. The packet processing is implemented via TCP input stream DeMUX and separation logic 320, begin with received MUX TCP packets 308 being buffered in Ethernet input port buffer 322. In a block 324, Ethernet de-framing and de-packetization is performed to extract MUX TCP packets 308 from their frames. As depicted by the light-gray shading, the operations performed by Ethernet input port buffer 322 and the Ethernet de-framing and de-packetization operations are conventional operations performed on TCP packets received at an Ethernet input port. Although not shown for simplicity, additional operations relating to implementing the TCP protocol would also be performed using well-known techniques.

The subsequent processing operations are non-standard and novel. In an encapsulated data segment separation block 326 the de-packetized TCP packets 300 are separated to output a bitstream of data segment data on a per-client ID—basis. Received data segments comprising sequential runs of bits for a given client are then pushed by a queue selector 328 into an appropriate TCP port input queue 330 associated with the client ID contained in the data segment header 311. Subsequently, the data segments are processed, in sequence, to generate reassembled client data streams including packet payload data 301R in its original format. As depicted by reassembled client data streams 110R, 112R, 114R, 116R, 118R, and 120R, the client data stream for each TCP connection is received at a software processing stack 332. The illustrated components for software processing stack 332 include a client stream processing block 334, and an HTTP/HTTPS layer 338. Client stream processing block 334 is used to extract the packet payload data comprising HTTP data (e.g., an HTTP Request) and forward it to HTTP/HTTPS layer 338. In one embodiment, client stream processing block 334 is implemented such that from the perspective of HTTP/HTTPS layer 338, the HTTP data was sent using a conventional TCP packet. HTTP/HTTPS layer 338 includes an HTTP/HTTPS server functions block 340, which is configured to perform conventional HTTP or HTTPS server functions (as applicable depending on whether the connection is an HTTP or HTTPS connection). By way of illustration, this is further depicted by an HTTP client session state 342 for each client ID, observing that HTTP itself is stateless, while an HTTP streaming connection supports a persistent connection.

Figure 4A:
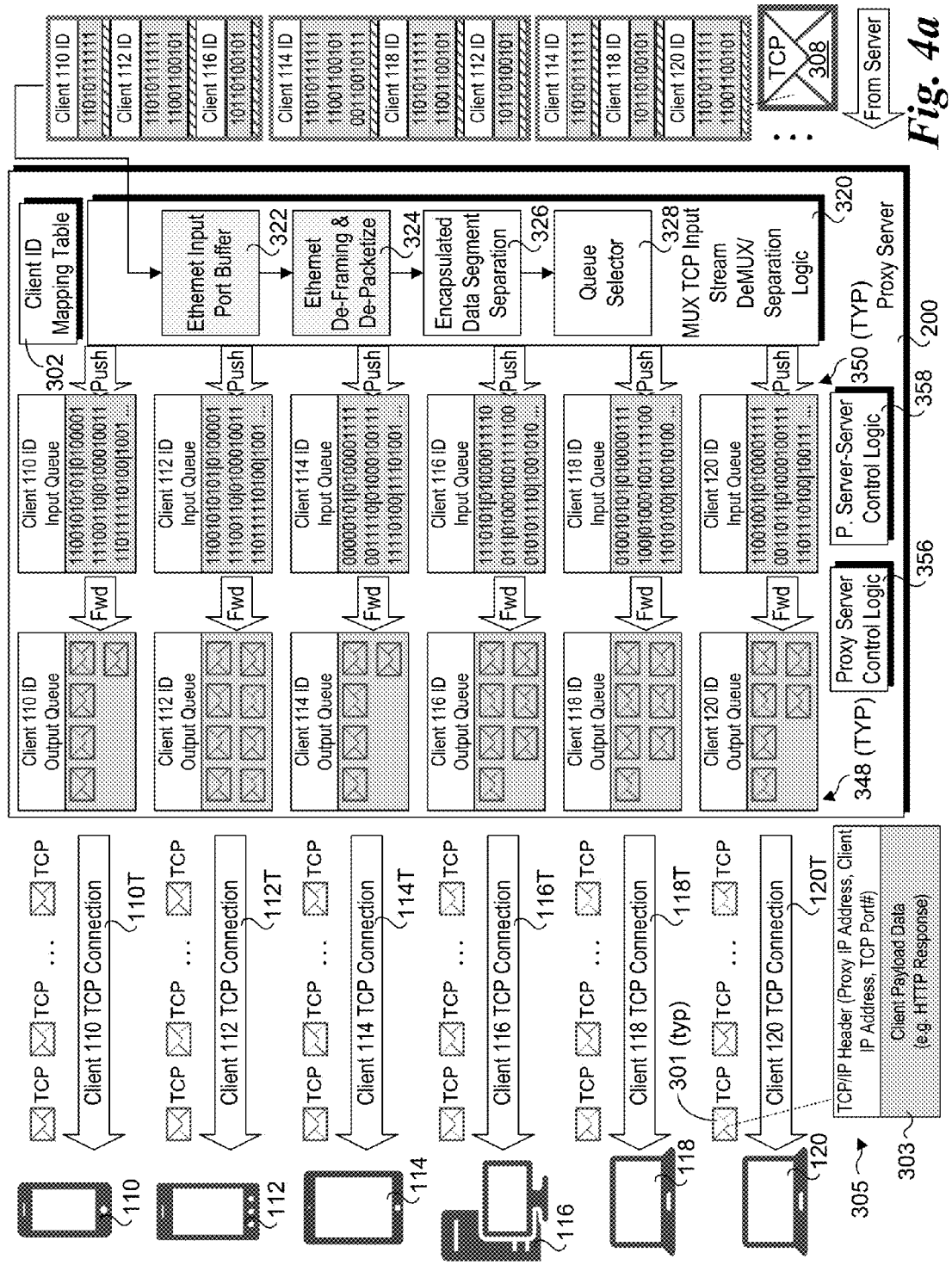
FIG. 4a is a schematic diagram illustrating components for processing multiplexed TCP packet data segments sent from the web server and received over a multiplexed TCP connection at a proxy server, according to one embodiment.
Figure 4A:
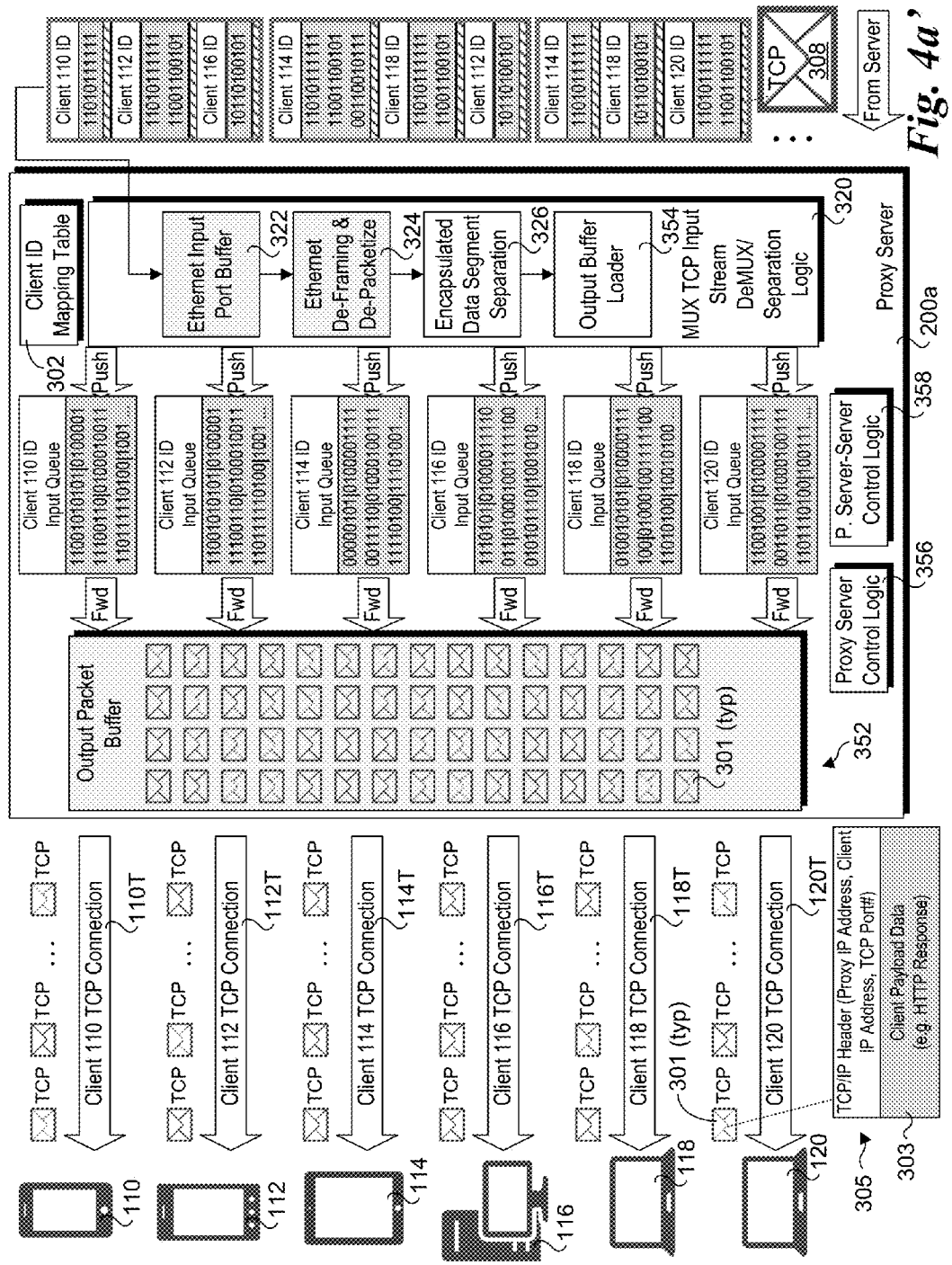
Figure 4B:
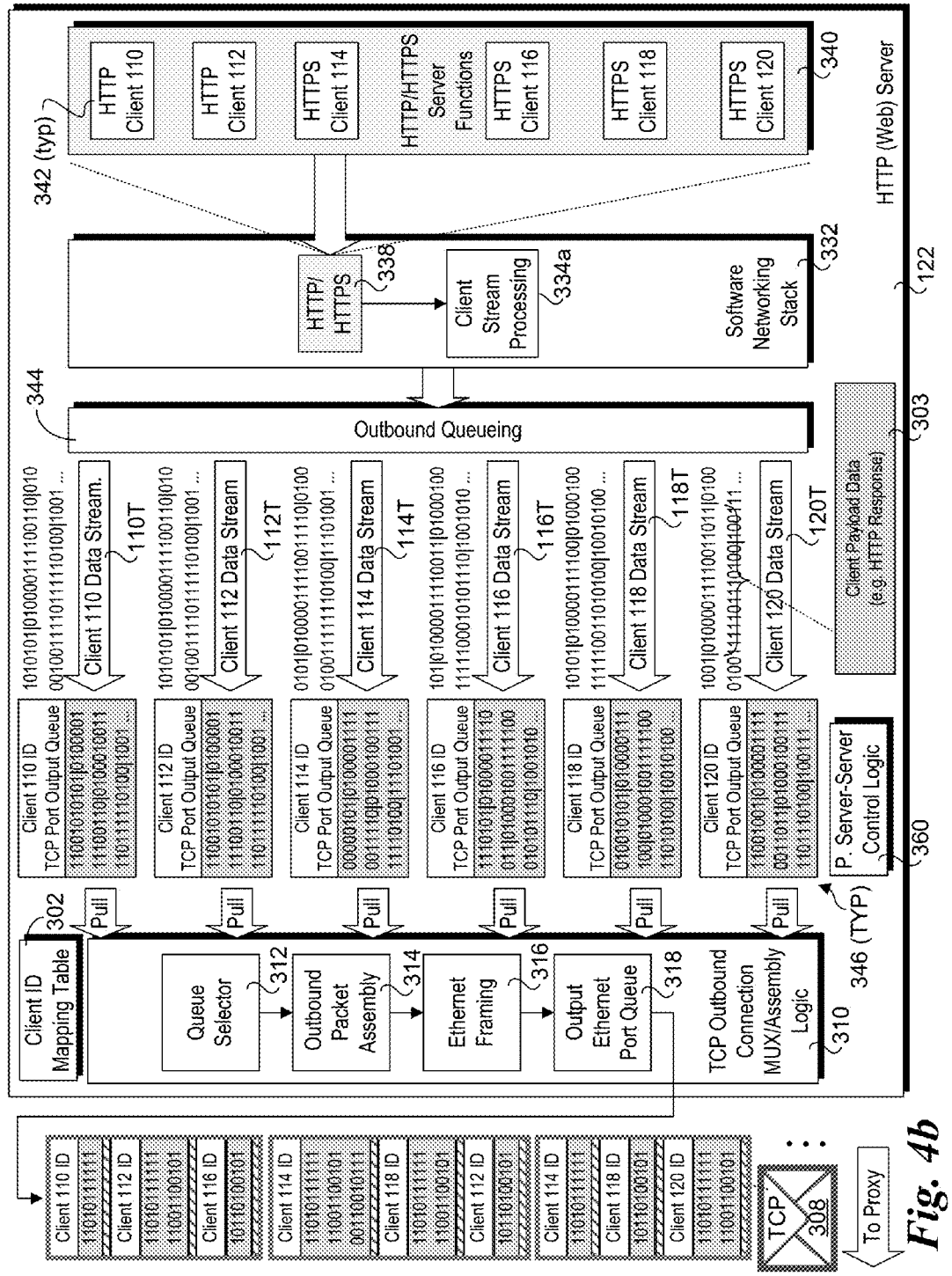
FIG. 4b is a schematic diagram illustrating packet processing in connection with sending TCP packets from a web server to a proxy server over a multiplexed TCP connection as multiplexed data segments, according to one embodiment.

To support traffic flow in the reverse direction from web server 122 to clients 110, 112, 114, 116, 118, and 120 via proxy server 200, similar components and logic shown in FIGS. 3*a* and 3*b* are swapped, as shown in FIGS. 4*a*, 4*a'* and 4*b*, where like-numbered components perform similar functions. In addition, there following provisions are added.

In further detail, software applications running on web server 122 or on another server (e.g., an application server) connected to web server 122 receive HTTP requests sent from clients and generate HTTP responses to be returned by clients. Some of the HTTP traffic may be handled entirely by HTTP/HTTPS server functions block 340, such as establishing and closing HTTP and TCP connections. In other cases, the data payload associated with an incoming HTTP communication is separated out by the HTTP layer and forwarded to the applicable application. In the reverse direction, applications generate HTTP response data that are returned to HTTP clients.

The HTTP response data is received at HTTP layer 338 and an applicable HTTP header is added (depending on the type of HTTP response). Subsequently, the HTTP response, which comprises packet payload data 303, is added to an outbound client data stream, as depicted by client data streams 110T, 112T, 114T, 116T, 118T, and 120T. The outbound client data stream for each TCP connection is buffered in an appropriate client output queue 346. In connection with opening a client ID TCP connection, a client output queue 346 is allocated by web server 122. In one embodiment, the applicable client output queue 346 is identified by a lookup of client ID mapping table 302.

The bitstream content comprising the client data streams is forwarded as data segments to proxy server 200 over the multiplexed TCP connection in a manner similar to how client data stream content in client output queues 306 is forwarded from proxy server 200 to web server 122. As before, this include encapsulating data segments 309 into MUX TCP packets 308, and transporting the MUX TCP packets over the multiplexed TCP connection.

Continuing at FIG. 4*a*, the MUX TCP packet 308 stream is received and processed by MUX TCP input stream DeMUX and separation logic 320 in a similar manner as discussed above with reference to FIG. 3*b*. In one embodiment, in connection with setting up a client ID TCP connection, a client output queue 348 and a client input queue 350 is allocated by proxy server 200. As further illustrated in FIG. 4*a*, the bitstream content for each data segment separated by encapsulated data segment separation block 326 is pushed by queue selector 328 into an applicable client input queue 350, and subsequently the client data streams are either pushed into the applicable client output queue 348 or pulled from the client input queue into the client output queue. Once in client output queues 348, the packet payload data 303 is extracted and encapsulated into TCP packets 305, which may then be forwarded to clients using conventional outbound TCP packet handling, wherein TCP packets are sent from a network port on proxy server 200 identified by the destination address in the TCP/IP header (e.g., via a forwarding table lookup).

An optional configuration for a proxy server 200*a* is shown in FIG. 4*a'*. Under this configuration, all or a portion of the client data streams are forwarded to an output packet buffer 352, wherein packet payload data 303 is extracted and encapsulated into TCP packets 305. The TCP packets 305 are then forwarded to clients 110, 112, 114, 116, 118, and 120 in the conventional manner by proxy server 200*a*.

In addition to the foregoing multiplexed TCP packet processing operations, proxy server 200 and web server 122 include additional logic for performing TCP connection setup and client-based TCP connection flow-control operations. On proxy server 200, these operations are facilitated by proxy server control logic 356 (used for interfacing with TCP clients) and proxy server-to-web server control logic 358. On web server 122 this is depicted as proxy server-to-web server control logic 360. Management of connections and client queues is facilitated by control messages sent between proxy server 200 and web server 122. Message flow diagrams corresponding to exemplary set-up and/or control functions are depicted in FIGS. 6 and 7.

Figure 6:
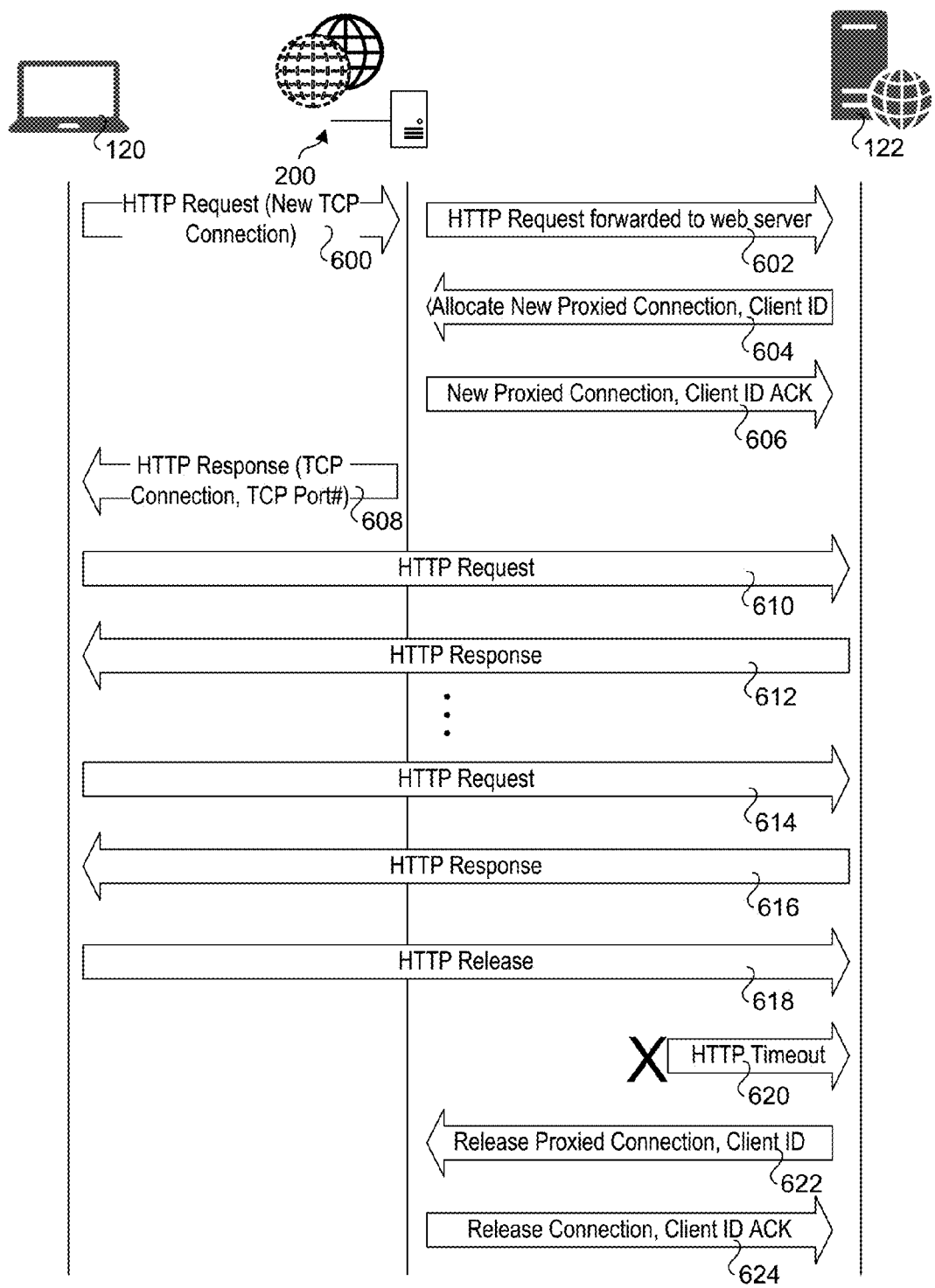
FIG. 6 is a message flow diagram illustrating exemplary sets of messages that are exchanged between a client, a proxy server, and a web server.
Figure 7:
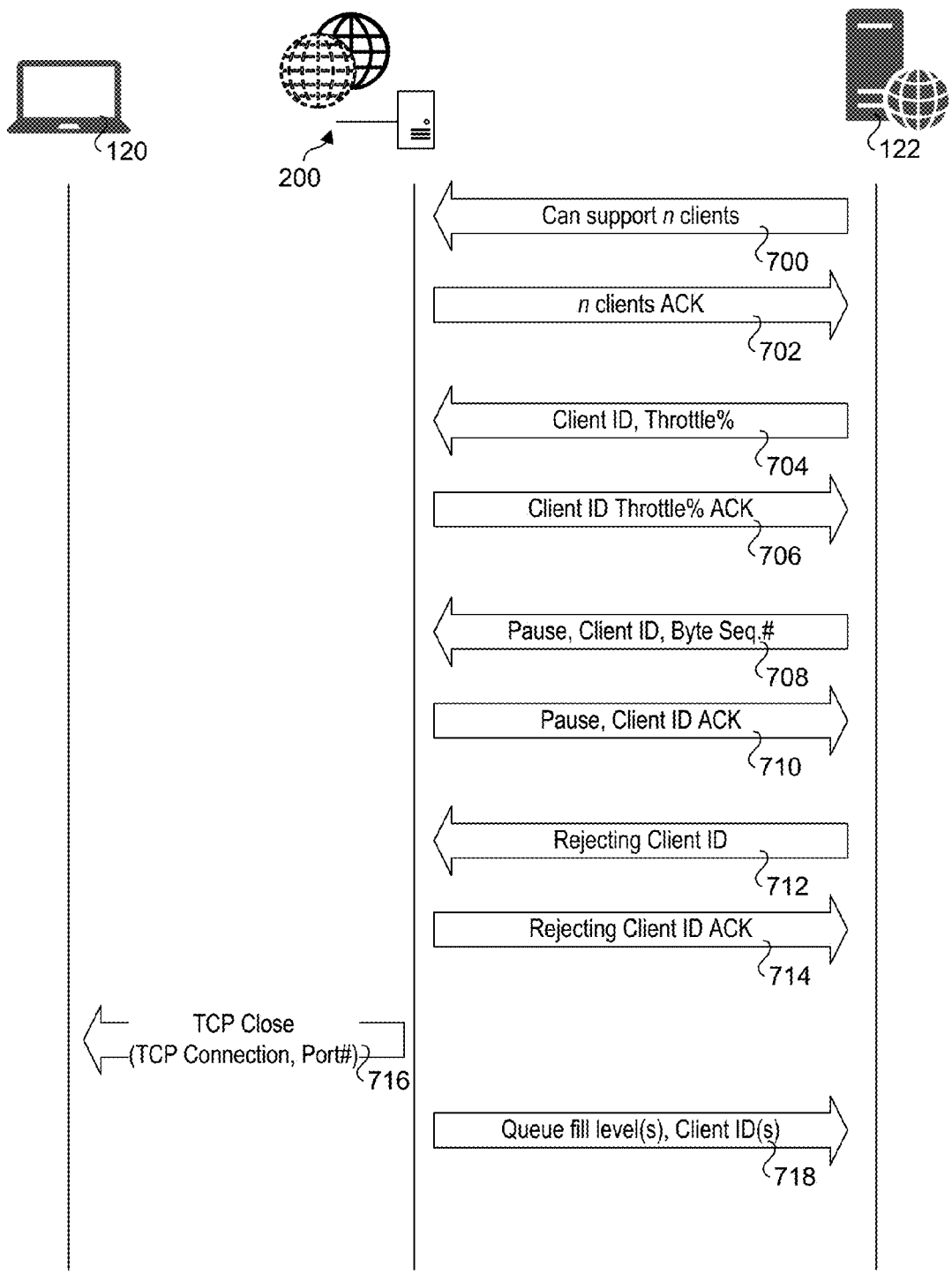
FIG. 7 is a message flow diagram illustrating an exemplary set of commands and control messages that are exchanged between a client, a proxy server, and a web server.

FIG. 6 shows a message flow diagram illustrating messages that are sent between a client 120, a proxy server 200, and a web server 122. The message sequence begins with an HTTP request 600 sent from client 120 to Web server 122. As discussed above, this may be accomplished by a user of client 120 entering the URL for a website hosted by or otherwise accessed through web server 122. In response, the DNS server (not shown) will return the IP address for proxy server 200 rather than web server 122.

An HTTP session is a sequence of network request-response transactions. An HTTP client initiates a request by establishing a TCP connection to a particular port on a server (typically port 80, although many other ports may also be used). An HTTP server at the IP address included in the initial HTTP request "listening" on that port is configured to set-up the TCP connection. Under the conventional approach, upon receiving the request, the HTTP server sends back an HTTP response message including a status line, such as "HTTP/1.1 200 OK". The body of this message is typically the requested resource, although an error message or other information may also be returned.

Under the proxy server approach provided herein, a different sequence occurs. Upon receipt of HTTP request 600, proxy server 200 recognizes this as being a request for a new TCP connection and forwards the request as a message 602 to web server 122. Web server 122 checks to see if it can support further connections, and if so returns a new proxied connection allocation request 604 including a client ID to proxy server 200. In response, proxy server 200 allocates an appropriate set of queues for that client ID (if available) and returns a new proxy connection ACKnowledgement (ACK) message 606. If proxy server 200 cannot allocate the client ID queues, it will return a different message indicating a new proxied connection cannot be supported at this time.

As discussed above, individual TCP connections are established between the clients and the proxy server. Accordingly, if the new proxied connection is successfully allocated, proxy server 200 returns an HTTP response 608 to client 120 indicating the TCP connection has been established, along with the TCP port number. As it is possible for a given client to establish multiple TCP connections with the same proxy server (each using different TCP ports), each unique TCP connection is identified by the combination of the IP address of the client and the TCP port number, as also identified above.

At this point, an HTTP connection is established between client 120 and proxy server 200, however, for all intents and purposes, it appears from the perspective of both client 120 and HTTP/HTTPS server functions 340 operating on web server 122 that the HTTP connection is between client 120 and web server 122. Thus client 120 is a physical HTTP endpoint and web server 122 is a virtual HTTP endpoint. A subsequent exchange of HTTP requests and HTTP responses (depicted by HTTP requests 610 and 614 and HTTP responses 612 and 616) is then exchanged between these HTTP endpoints, with each HTTP request first traversing a TCP connection between the client and the proxy server and then being forwarded to the web server via the multiplexed TCP connection, and each HTTP response traversing the reverse path.

As depicted by an HTTP release message 618, either of the HTTP endpoints can explicitly request to release the HTTP connection. For example, for a well-behaved web browser such as Google Chrome, Microsoft Internet Explorer, Apple Safari, or Mozilla Firefox, when a user closes a tab the web browser (which comprises the client) sends an HTTP release message to the web server associated with the URL for the tab that was closed. Optionally, a web server can detect that an HTTP connection no longer exists via an HTTP timeout 620 (which isn't a separate message, but rather something determined internally by the web server).

As this point, the proxied connection is released, along with the client ID queue resources. Web server 122 sends a proxied connection release message 622 including the client ID to proxy server 200. In response, proxy server 622 returns a release proxied connection ACK message, including the client ID. At this point, both the proxy server 200 and web server 122 release the client ID queues that were allocated for the proxied connection that has been released.

One novel aspect of the multiplexed TCP architecture is the ability for a web server to effect flow control for individual TCP connections. For example, while the multiplexed TCP connections disclosed herein share some similarities with conventional tunneled connections, such tunneled connections merely encapsulate packet streams with no provisions for separate bandwidth allocations for individual TCP connections. Under the techniques disclosed herein, a web server may dynamically reallocate the bandwidth slice allocated for a given TCP connection, including temporarily pausing the connection. In association with these flow control operations managed by the web server, the proxy server can implement (as applicable) corresponding TCP flow control measures on its TCP connections with the client, such as to prevent buffer overflows and resulting packet drops.

In one embodiment, a web server is enabled to inform or instruct a proxy server to how many clients the web server can support. As shown in FIG. 7, this may be accomplished with a number of clients supported message 700 that identifies a number (n) of clients web server 122 can support. In response, proxy server 200 returns a number of clients supported ACK message 702.

A web server may also instruct a proxy server to throttle a given client, or temporarily shutdown forwarding packets for a given client. For example, web server 122 may send a throttle command 704 instructing proxy server 200 to throttle the forwarding of packets corresponding to a particular client connection, as identified by the client ID. In response, proxy server 200 will reply with a throttle command ACK message 706. If there is still too much incoming data, a web server may selectively choose to temporarily pause receipt of TCP packets for one or more proxied connections. This is depicted in FIG. 7 as a shutdown connection message 708 that identifies the client ID to temporarily pause, as well as the byte sequence number representing the last byte to send prior to pausing. Proxy server 200 responds with a pause ACK message, identifying the client ID.

During ongoing operations, a web server may detect that it is servicing too many clients (and forced to drop packets, as a result). In response to this type of condition, web server 122 sends a client rejection message 712, identifying one or more client ID corresponding to client connections to reject. In response, proxy server 200 returns a client rejection ACK message 714. Also, proxy server 200 sends an HTTP connection close message 716 to the applicable client(s).

A proxy server and/or web server may send information pertaining to the queue fill level of one or more queues and associated client IDs, as depicted by a queue fill level 718. This type of message may also be sent in connection with a throttling command. As another option, a sending server may send a receiving server a throttling up command or request, requesting or instructing the receiving server to expect or configure for an increased packet flow for a given client ID connection.

Generally, control messages between a proxy server and web server may be sent over a multiplexed TCP connection (e.g., by setting the data/control flag to the control indicator), or may be sent over a separate connection (not shown), which is sometimes referred to as a back-channel, control-channel, or side-band connection. Various packet formats may be used to facilitate the control messaging, and the particular format used is outside the scope of this disclosure, as techniques for implementing control messaging between servers is well-known in the art. In addition, messages that are depicted in FIG. 7 as originating from web server 122 might also originate from proxy server 200 under applicable circumstances. For example, a proxy server may also issue a throttling command or a temporary shutdown command to a web server.

Further examples of control information include the following. The control information from a proxy might say, "new client, I'd like to use nickname N." In response, the server might say "too many clients" or "OK. Accepting new client N". In one embodiment the sequence number for data for client N starts with 1, or some other predetermined number (as opposed to TCP which does funny things with initial sequence numbers, but here, it's inside a TCP connection between the proxy and the server, so it's fine to start each client's data off at 1).

To initiate closing a connection, either the proxy or server might send a control messaging saying "client N is done, and I want to be able to reuse the client ID #N". In response, the recipient (either proxy or server, as applicable) might say, "I'm accepting client N's data up to sequence number S1, and client J's data up to sequence number S2".

As a further example, the proxy might send, (inside TCP information to the server), perhaps at sequence number 191 for the P-S TCP connection:

client X, sequence #15, 92 bytes of data
client Y, sequence #51, 12 bytes of data In response, the server might say, "I've accepted all data you sent up to our TCP sequence number 305," or it might separately say "ACK client X up to 106, ACK client Y up to 63". Or, if the server can't accept any more data from Y, it might say "ACK client Y up to 53" (if it only accepted 2 bytes of data from Y, and then the proxy will have to resend the rest from Y later).

Exemplary Implementation Environment and Server Architectures

It is envisioned that aspects of the embodiments herein may be implemented in various types of computing and networking equipment, such as various types of servers employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 8a-c, and 9. Under a typical configuration, a rack-mounted chassis 800 is employed to provide power and communication functions for a plurality of server blades (a.k.a., blades) 802, each of which occupies a corresponding slot. (It is noted that all slots in a chassis do not need to be occupied.) In turn, one or more chassis 800 may be installed in a blade server rack 803 shown in FIG. 8c. Each blade is coupled to an interface plane 804 (e.g., a backplane or mid-plane) upon installation via one or more mating connectors. Typically, the interface plane will include a plurality of respective mating connectors that provide power and communication signals to the blades, and including routed signal paths for coupling Ethernet signals between blades. Under current practices, many interface planes provide "hot-swapping" functionality—that is, blades can be added or removed ("hot-swapped") on the fly, without taking the entire chassis down through appropriate power and data signal buffering.

Figure 8A:
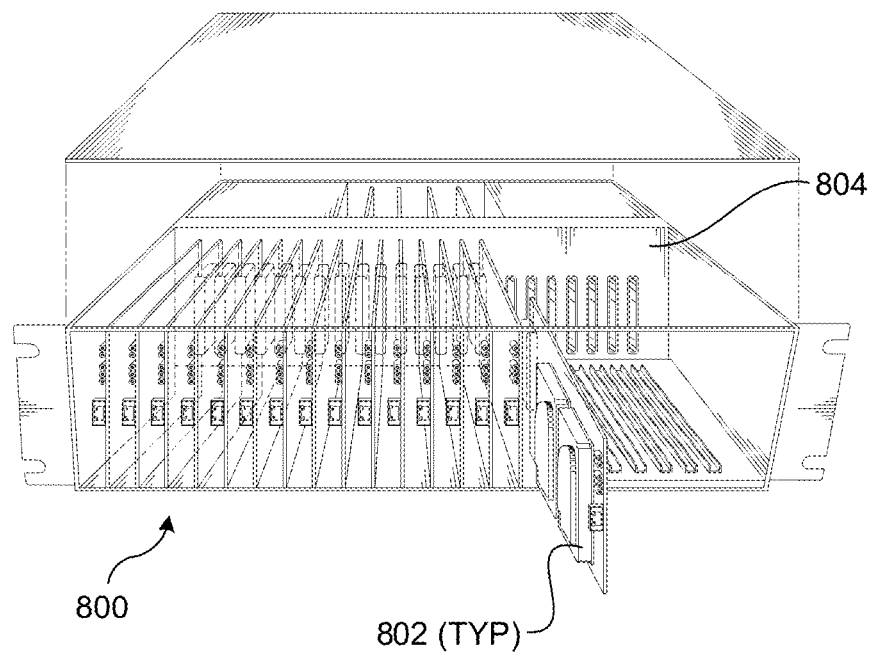
FIG. 8a is a frontal isometric view of an exemplary blade server chassis in which a plurality of server blades are installed.
Figure 8B:
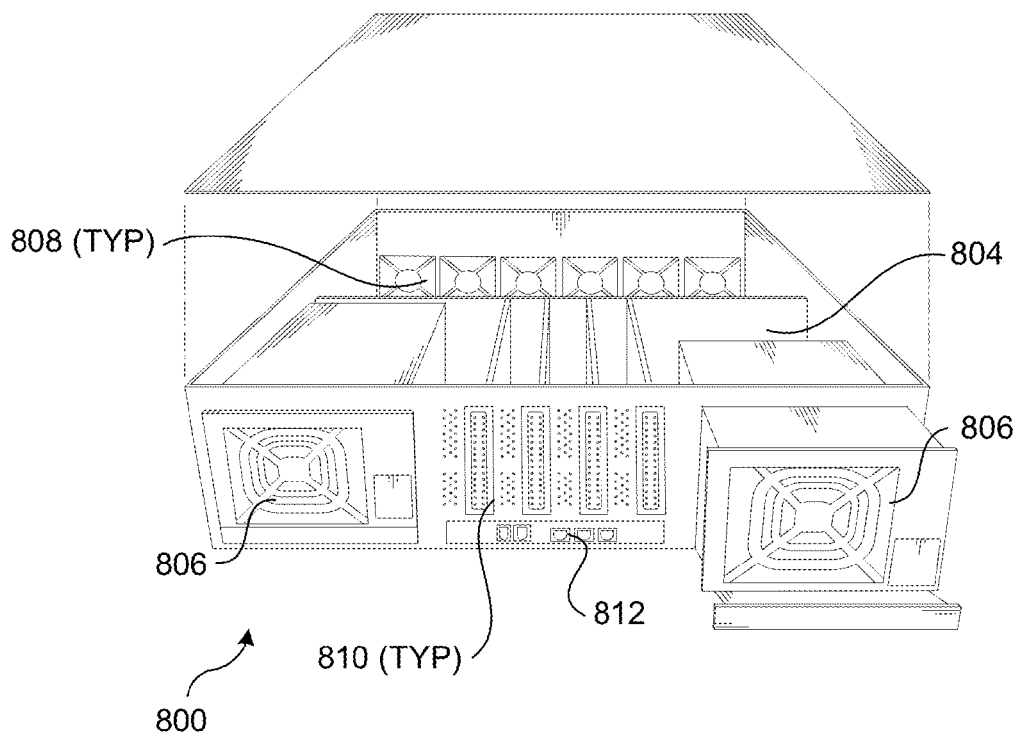

A typical mid-plane interface plane configuration is shown in FIGS. 8a and 8b. The backside of interface plane 804 is coupled to one or more power supplies 806. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 808 are employed to draw air through the chassis to cool the server blades.

An important feature required of all blade servers is the ability to communicate externally with other IT infrastructure. This is typically facilitated via one or more network connect cards 810, each of which is coupled to interface plane 804. Generally, a network connect card may include a physical interface comprising a plurality of network port connections (e.g., RJ-45 ports), or may comprise a high-density connector designed to directly connect to a network device, such as a network switch, hub, or router. It is noted that other network architectures may also be used, such as Top of Rack (ToR) switch architecture and disaggregated switch architectures, and the network links may comprise wired and/or optical cables.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 812 that is coupled to the backside or frontside of the interface plane. As yet another option, a management or configuration server may be employed to manage blade activities, wherein communications are handled via standard computer networking infrastructure, for example, Ethernet.

With reference to FIG. 9, further details of an exemplary blade 900 are shown. As discussed above, each blade comprises a separate computing platform that is configured to perform server-type functions, i.e., is a "server on a card." Accordingly, each blade includes components common to conventional servers, including a main printed circuit board (main board) 901 providing internal wiring (i.e., buses) for coupling appropriate integrated circuits (ICs) and other components mounted to the board. These components include one or more processors (a.k.a. CPUs) 902 coupled to system memory 904 (e.g., some form of Random Access Memory (RAM)), cache memory 906 (e.g., SDRAM), and a firmware storage device 908 (e.g., flash memory). A NIC (network interface controller) chip 910 is provided for supporting conventional network communication functions, such as to support communication between a blade and external network infrastructure. Other illustrated components include status LED (light-emitting diodes) 912, one or more RJ-45 Ethernet ports 914 (only one of which is shown for simplicity), and an interface plane connector 916. Additional components include various passive components (i.e., resistors, capacitors), power conditioning components, and peripheral device connectors.

Generally, each blade 900 may also provide on-board storage. This is typically facilitated via one or more built-in disk controllers and corresponding connectors to which one or more disk drives 918 are coupled. For example, typical disk controllers include SATA controllers, SCSI controllers, and the like. Generally, a disk drive 918 may comprise a magnetic drive or a solid state drive (SSD). As an option, the disk drives may be housed separate from the blades in the same or a separate rack, such as might be the case when a network-attached storage (NAS) appliance or backend storage sub-system that is employed for storing large volumes of data.

NIC 910 comprises circuitry and logic for facilitating corresponding networking operations, such as support for physical layer (L1) and data link layer operations (L2) (e.g., Ethernet MAC operations). Typically, upper layer operations are facilitated by an operating system network stack that would be hosted by an operating system running on processor 902. However, in some embodiments, a NIC may employ its own network stack via embedded logic or the like.

Generally, today's server processors employ System on a Chip (SoC) architectures, under which multiple functional components, blocks, and interfaces are integrated on a chip. Under some SoC architectures, a processor includes a CPU comprising multiple cores.

In a typical data center deployment, network switching elements comprise rack-mounted equipment, such as would occupy a 1U, 2U, or 4U slot, or may be implemented via one or more server blades. Optionally, a network switching element may be implemented use one or more server blades.

Depending on workload, the proxy server and web server operations described herein may be implemented via a single blade, a set of blades occupying a portion of the slots in a chassis, a chassis with multiple blades, or other types of servers that are deployed in today's and future data center environments, such as multi-socketed servers. The proxy servers and web servers may be implemented as physical entities in some embodiments, while other embodiments may employ a combination of physical and virtual entities.

Further aspects of the subject matter described herein are set out in the following numbered clauses:

1. A method comprising:

establishing, at a proxy server, a plurality of TCP connections with a plurality of clients, each TCP connection connecting a client with the proxy server using a TCP port;

coupling the proxy server in communication with a web server via a multiplexed TCP connection;

receiving incoming TCP communications at the proxy server originating from the plurality of clients, each incoming TCP communication including at least one TCP packet including packet payload data;

buffering the packet payload data contained in TCP packets received over a given TCP connection in a respective client data stream;

encapsulating, at the proxy server, data segments comprising sequential runs of bits in the client data streams into multiplexed (MUX) TCP packets, wherein at least a portion of the MUX TCP packets encapsulates data segments from at least two separate client data streams;

transporting the MUX TCP packets from the proxy server to the web server over the multiplexed TCP connection; and at the web server, de-encapsulating data segments in the MUX TCP packets and reassembling the client data streams; and extracting packet payload data from the reassembled client data streams.

2. The method of clause 1, wherein the one or more TCP packets received over a first TCP connection comprise a HyperText Transport Protocol (HTTP) request sent from a first client, the method further comprising returning an HTTP response to the first client by:

embedding the HTTP response in a client data stream destined for the first client;

encapsulating data segments comprising sequential runs of bits corresponding to the client data stream in one or more MUX TCP packets;

transporting the one or more MUX TCP packets from the web server to the proxy server over the multiplexed TCP connection;

de-encapsulating the data segments from the MUX TCP packet;

re-assembling the client data stream; and extracting the HTTP response and encapsulating the HTTP response in one or more TCP packets that are forwarded from the proxy server to the destined client over the first TCP connection.

3. The method of clause 1 or 2, further comprising:

for each TCP connection, allocating at least one queue on the proxy server for the TCP connection; and buffering a client data streams comprising packet payload data contained in TCP packets received over the TCP connection in the at least one queue allocated for the TCP connection.

4. The method of clause 3, wherein the at least one queue on the proxy server allocated for each TCP connection includes an output queue, the further comprising:

buffering a client data stream comprising sequential runs of packet payload data contained in TCP packets transferred over the TCP connection in the output queues on the proxy server; wherein each output queue is allocated for a respective TCP connection;

generating a stream of MUX TCP packets to be transported to the web server via the multiplexed TCP connection by using a queue selector to select output queues to pull data segments from to be encapsulated in respective MUX TCP packets in the stream of MUX TCP packets.

5. The method of any of the proceeding clauses, further comprising:

receiving an HyperText Transport Protocol (HTTP) request sent from a new client to access a Universal Resource Locator (URL) for a website accessed via the web server;

establishing a new TCP connection between the new client and the proxy server; and allocating queues on each of the proxy server and the web server to support forwarding of HTTP requests received at the proxy server from the new client to the web server via the multiplexed TCP connection, and for forwarding HTTP responses generated at the web server to the new client via the multiplexed TCP connection to the proxy server and the new TCP connection.

6. The method of any of the proceeding clauses, wherein the multiplexed TCP connection has an overall bandwidth, the method further comprising:

allocating a respective bandwidth slice of the overall bandwidth of the multiplexed TCP connection for each TCP connection established with the proxy server and for which TCP packets are to be forwarded over the multiplexed TCP connection; and enabling the bandwidth slice allocated for an individual TCP connection to be dynamically adjusted.

7. The method of any of the proceeding clauses, further comprising:

enabling at least one of the web server and proxy server to manage a rate of transfer of data for individual TCP connections that are forwarded over the multiplexed TCP connection.

8. The method of clause 7, further comprising enabling at least one of the web server and proxy server to pause traffic corresponding to a selected TCP connection from being forwarded over the multiplexed TCP connection.

9. The method of clause 8, wherein the web server sends a request to the proxy server to pause traffic for a given TCP connection, the method further comprising:

continuing to buffer incoming TCP traffic received from a client over the TCP connection;

receiving an indication that the traffic for the TCP connection is permitted to resume; and resume sending of data segments corresponding to TCP traffic that has accumulated in the buffer from the proxy server to the web server.

10. The method of any of the proceeding clauses, further comprising:

sending information from the web server to the proxy server identifying a maximum number of simultaneous data streams that may be multiplexed and sent over the multiplexed TCP connection;

establishing a number of client connections corresponding to the maximum number of simultaneous data streams;

receiving, at the proxy server, data from a new client that desires to communicate with the web server;

buffering the data from the new client; and in response to determining an existing client is done communicating with the server, negotiating a new client connection with the web server for the new client.

11. A web server apparatus, comprising:

a processor;

memory, operatively coupled to the processor;

a network adapter including at least one network port, operatively coupled to the processor; and a storage device having instructions stored therein comprising a plurality of software modules that are configured to be executed by the processor to enable the web server apparatus to, establish a multiplexed TCP connection between a proxy server and the web server, the multiplexed TCP connection configured to transport data over forwarding path including a link coupled to a network port on the network adaptor, wherein a plurality of clients are connected to the proxy server via respective TCP connections; and send client data stream data destined for the plurality of clients to the proxy server over the multiplexed TCP connection as a stream of multiplexed (MUX) TCP packets, each MUX TCP packet encapsulating one or more data segments comprising sequential runs of bits from one or more client data streams comprising packet payload data to be encapsulated in TCP packets to be forwarded via the proxy server to a client over the TCP connection between the proxy server and the client, wherein at least a portion of the MUX TCP packets encapsulate data segments for at least two separate client data streams.

12. The web server apparatus of clause 11, wherein the plurality of software modules are further configured to enable the web server apparatus to:

receive a stream of MUX TCP packets over the multiplexed TCP connection from the proxy server, wherein each MUX TCP packet encapsulates one or more data segments, and each data segment comprises a portion of client data stream received from a TCP client;

de-encapsulate data segments in the MUX TCP packets and reassemble the client data streams; and extract packet payload data from the reassembled client data streams.

13. The web server apparatus of clause 12, wherein the plurality of software modules are further configured to enable the web server apparatus to:

allocate a respective set of queues in a memory space of the memory for each of the TCP connections used to connect the plurality of clients to the proxy server, wherein the respective set of queues for a given TCP connection includes at least one output queue and at least one input queue.

14. The web server apparatus of clause 12, wherein each TCP connection and the queues in the set of queues allocated for the connection are identified by a unique client identifier.

15. The web server apparatus of any of clauses 11-15, wherein the plurality of modules include a software processing stack, and wherein the plurality of software modules are further configured to enable the web server apparatus to:

enqueue client data streams generated by the software processing stack in a plurality of output queues, wherein data contained in the client data streams enqueued for each output queue are destined for a single client;

generate a stream of MUX TCP packets by using a queue selector to select output queues to pull data segments from to be encapsulated in respective MUX TCP packets in the stream of MUX TCP packets.

16. The web server apparatus of clause 15, wherein the plurality of software modules are further configured to enable the web server apparatus to:

allocate a respective bandwidth slice of the multiplexed TCP connection for each of the TCP connections; and implement a queue selection algorithm that selects output queues to pull data segments from in accordance with the bandwidth slices allocated for the TCP connections.

17. The web server apparatus of clause 16, wherein the plurality of software modules are further configured to enable the web server apparatus to:

at least one of throttle or pause client data streams transported via the multiplexed TCP connection and associated with selected TCP connections on an individual basis.

18. A proxy server apparatus, configured to operate as a proxy server for a web server, comprising:

a processor;

memory, operatively coupled to the processor;

a plurality of network ports, operatively coupled to the processor; and a storage device having instructions stored therein comprising a plurality of software modules that are configured to be executed by the processor to enable the proxy server apparatus to, establish, at a first network port, a plurality of TCP connections with respective clients;

establish a multiplexed TCP connection between the proxy server and the web server, the multiplexed TCP connection configured to transport data over a forwarding path including a link coupled to a second network port on the proxy server apparatus;

receive TCP packets from the plurality of clients over the plurality of TCP connections;

identify TCP packets that are to be proxied via the proxy server apparatus to the web server;

buffer data contained in TCP packets that are to be proxied via the proxy server apparatus and that are received over a given TCP connection in a respective client data stream;

encapsulate data segments comprising sequential runs of the client data streams in multiplexed (MUX) TCP packets, at least a portion of the MUX TCP packets encapsulating data segments comprising sequential runs of at least two separate client data streams; and send the MUX TCP packets outbound from the second network port to be forwarded to the web server over the multiplexed TCP connection.

19. The proxy server apparatus of clause 18, wherein the plurality of software modules are further configured to enable the proxy server apparatus to:

receive a stream of MUX TCP packets over the multiplexed TCP connection from the web server, each MUX TCP packet encapsulating one or more data segments comprising sequential runs of bits in one or more client data streams;

de-encapsulate the one or more data segments encapsulated in the MUX TCP packets;

re-assemble the client data streams;

identify a TCP connection associated with a given client data stream;

encapsulate packet payload data extracted from the given client data stream in TCP packets destined for a client associated with the given client data stream; and forward the TCP packets to the destined client over the TCP connection for the client.

20. The proxy server apparatus of clause 18, wherein the plurality of software modules are further configured to enable the proxy server apparatus to:

allocate a respective set of queues in a memory space of the memory for each of the TCP connections used to connect the plurality of clients to the proxy server, wherein the respective set of queues for a given TCP connection includes at least one output queue in which TCP packets that are to forwarded to the web server via the multiplexed TCP connection are buffered.

21. The proxy server apparatus of clause 20, wherein the plurality of software modules are further configured to enable the proxy server apparatus to:

allocate a respective bandwidth slice of the multiplexed TCP connection for each of the TCP connections; and implement a queue selection algorithm that selects output queues to pull data segments from in accordance with the bandwidth slices allocated for the TCP connections.

22. The proxy server apparatus of clause 18, wherein the plurality of software modules are further configured to enable the proxy server apparatus to:

receive one of a throttle command and pause command from the web server identifying a TCP connection; and in response one of throttle and pause a client data stream associated with the TCP connection that is transported over the multiplexed TCP connection.

23. At least one non-transient machine-readable medium having instructions stored thereon comprising a plurality of software modules configured to be executed on a proxy server and web server to enable the proxy server and web server to:

establish, at a proxy server, a plurality of TCP connections with a plurality of clients, each TCP connection connecting a client with the proxy server using a TCP port;

couple the proxy server in communication with the web server via a multiplexed TCP connection;

receive incoming TCP communications at the proxy server originating from the plurality of clients, each incoming TCP communication including at least one TCP packet containing data comprising a HyperText Transport Protocol (HTTP) request;

extract packet payload data comprising HTTP requests from the TCP packets for a given TCP connection and add the extracted packet payload data to a client data stream;

encapsulate, at the proxy server, data segments comprising sequential runs of bits of client data streams into multiplexed (MUX) TCP packets, wherein at least a portion of the MUX TCP packets encapsulate data segments from multiple client data streams;

transporting the MUX TCP packets from the proxy server to the web server over the multiplexed TCP connection; and at the web server, de-encapsulate data segments in the MUX TCP packets and reassembling the client data streams; and extract HTTP requests from the reassembled client data streams.

24. The at least one non-transient machine-readable medium of clause 23, wherein the one plurality of software modules are further configured, upon execution, to enable the proxy server and web server to:

embed an HTTP response to an HTTP request in a client data stream destined for the client that sent the HTTP request;

encapsulate one or more data segments corresponding to the client data stream in one or more MUX TCP packets;

transport the one or more MUX TCP packets from the web server to the proxy server over the multiplexed TCP connection;

de-encapsulate the one or more data segments encapsulated in the one or more MUX TCP packets;

re-assemble the client data stream;

identify a TCP connection associated with the client data stream;

extract the HTTP response from the re-assembled client data stream and encapsulate the HTTP response in one or more TCP packets destined for a client associated with the client data stream; and forward the one or more TCP packets to the destined client over the TCP connection for the client.

25. The at least one non-transient machine-readable medium of clause 24, wherein each of the one or more TCP packets in which the HTTP response is embedded have a source Internet Protocol (IP) address corresponding to an IP address for the proxy server and a destination IP address corresponding to an IP address for the destined client.

26. The at least one non-transient machine-readable medium of any of clauses 23-25, wherein the one plurality of software modules are further configured, upon execution, to enable the proxy server and web server to:

for each TCP connection, allocate at least one queue on the proxy server for the TCP connection; and buffer a client data streams comprising packet payload data contained in TCP packets received over the TCP connection in the at least one queue allocated for the TCP connection.

27. The at least one non-transient machine-readable medium of clause 26, wherein the at least one queue on the proxy server allocated for each TCP connection includes an output queue, and wherein the one plurality of software modules are further configured, upon execution, to enable the proxy server and web server to:

buffer a client data stream comprising sequential runs of packet payload data contained in TCP packets transferred over the TCP connection in the output queues on the proxy server; wherein each output queue is allocated for a respective TCP connection;

generate a stream of MUX TCP packets to be transported to the web server via the multiplexed TCP connection by using a queue selector to select output queues to pull data segments from to be encapsulated in respective MUX TCP packets in the stream of MUX TCP packets.

28. The at least one non-transient machine-readable medium of any of clauses 23-27, wherein the one plurality of software modules are further configured, upon execution, to enable the proxy server and web server to:

receive an HTTP request sent from a new client to access a Universal Resource Locator (URL) for a website accessed via the web server;

establish a new TCP connection between the new client and the proxy server; and allocate queues on each of the proxy server and the web server to support forwarding of HTTP requests received at the proxy server from the new client to the web server via the multiplexed TCP connection, and for forwarding HTTP responses generated at the web server to the new client via the multiplexed TCP connection to the proxy server and the new TCP connection.

29. The at least one non-transient machine-readable medium of any of clauses 23-28, wherein the multiplexed TCP connection has an overall bandwidth, and wherein the one plurality of software modules are further configured, upon execution, to enable the proxy server and web server to:

allocate a respective bandwidth slice of the overall bandwidth of the multiplexed TCP connection for each TCP connection established with the proxy server and for which TCP packets are to be forwarded over the multiplexed TCP connection; and enable the bandwidth slice allocated for an individual TCP connection to be dynamically adjusted.

30. The at least one non-transient machine-readable medium of any of clauses 23-29, wherein the one plurality of software modules are further configured, upon execution, to enable at least one of the web server and proxy server to manage a rate of transfer of data for individual TCP connections that are forwarded over the multiplexed TCP connection.

31. The at least one non-transient machine-readable medium of any of clauses 23-30, wherein the one plurality of software modules are further configured, upon execution, to enable at least one of the web server and proxy server to pause traffic corresponding to a selected TCP connection from being forwarded over the multiplexed TCP connection.

32. The at least one non-transient machine-readable medium of clause 31, wherein the web server sends a request to the proxy server to pause traffic for a given TCP connection, and wherein the one plurality of software modules are further configured, upon execution, to enable the proxy server and web server to:

continue to buffer incoming TCP traffic received from a client over the TCP connection;

receive an indication that the traffic for the TCP connection is permitted to resume; and resume sending of data segments corresponding to TCP traffic that has accumulated in the buffer from the proxy server to the web server.

33. The at least one non-transient machine-readable medium of any of clauses 23-32, wherein the one plurality of software modules are further configured, upon execution, to enable the proxy server and web server to:

send information from the web server to the proxy server identifying a maximum number of simultaneous data streams that may be multiplexed and sent over the multiplexed TCP connection;

establish a number of client connections corresponding to the maximum number of simultaneous data streams;

receive, at the proxy server, data from a new client that desires to communicate with the web server;

buffer the data from the new client; and in response to determining an existing client is done communicating with the server, negotiate a new client connection with the web server for the new client.

34. A web server apparatus, comprising:

a processor;

memory, operatively coupled to the processor;

a network adapter including at least one network port, operatively coupled to the processor; and means for, establishing a multiplexed TCP connection between a proxy server and the web server, the multiplexed TCP connection configured to transport data over forwarding path including a link coupled to a network port on the network adaptor, wherein a plurality of clients are connected to the proxy server via respective TCP connections; and sending client data stream data destined for the plurality of clients to the proxy server over the multiplexed TCP connection as a stream of multiplexed (MUX) TCP packets, each MUX TCP packet encapsulating one or more data segments comprising sequential runs of bits from one or more client data streams comprising packet payload data to be encapsulated in TCP packets to be forwarded via the proxy server to a client over the TCP connection between the proxy server and the client, wherein at least a portion of the MUX TCP packets encapsulate data segments for at least two separate client data streams.

35. The web server apparatus of clause 34, further comprising means for:

receiving a stream of MUX TCP packets over the multiplexed TCP connection from the proxy server, wherein each MUX TCP packet encapsulates one or more data segments, and each data segment comprises a portion of client data stream received from a TCP client;

de-encapsulating data segments in the MUX TCP packets and reassemble the client data streams; and extracting packet payload data from the reassembled client data streams.

36. The web server apparatus of clause 35, further comprising means for allocating a respective set of queues in a memory space of the memory for each of the TCP connections used to connect the plurality of clients to the proxy server, wherein the respective set of queues for a given TCP connection includes at least one output queue and at least one input queue.

37. The web server apparatus of clause 35, wherein each TCP connection and the queues in the set of queues allocated for the connection are identified by a unique client identifier.

38. The web server apparatus of any of clauses 34-38, further comprising means for:

enqueueing client data streams generated by the software processing stack in a plurality of output queues, wherein data contained in the client data streams enqueued for each output queue are destined for a single client;

generating a stream of MUX TCP packets by using a queue selector to select output queues to pull data segments from to be encapsulated in respective MUX TCP packets in the stream of MUX TCP packets.

39. The web server apparatus of clause 38, further comprising means for:

allocating a respective bandwidth slice of the multiplexed TCP connection for each of the TCP connections; and implementing a queue selection algorithm that selects output queues to pull data segments from in accordance with the bandwidth slices allocated for the TCP connections.

40. The web server apparatus of clause 39, further comprising means for:

at least one of throttle or pause client data streams transported via the multiplexed TCP connection and associated with selected TCP connections on an individual basis.

41. A proxy server apparatus, configured to operate as a proxy server for a web server, comprising:

a processor;

memory, operatively coupled to the processor;

a plurality of network ports, operatively coupled to the processor; and means for, establishing, at a first network port, a plurality of TCP connections with respective clients;

establishing a multiplexed TCP connection between the proxy server and the web server, the multiplexed TCP connection configured to transport data over a forwarding path including a link coupled to a second network port on the proxy server apparatus;

receiving TCP packets from the plurality of clients over the plurality of TCP connections;

identifying TCP packets that are to be proxied via the proxy server apparatus to the web server;

buffering data contained in TCP packets that are to be proxied via the proxy server apparatus and that are received over a given TCP connection in a respective client data stream;

encapsulating data segments comprising sequential runs of the client data streams in multiplexed (MUX) TCP packets, at least a portion of the MUX TCP packets encapsulating data segments comprising sequential runs of at least two separate client data streams; and sending the MUX TCP packets outbound from the second network port to be forwarded to the web server over the multiplexed TCP connection.

42. The proxy server apparatus of clause 41, further comprising means for:

receiving a stream of MUX TCP packets over the multiplexed TCP connection from the web server, each MUX TCP packet encapsulating one or more data segments comprising sequential runs of bits in one or more client data streams;

de-encapsulating the one or more data segments encapsulated in the MUX TCP packets;

re-assembling the client data streams;

identifying a TCP connection associated with a given client data stream;

encapsulating packet payload data extracted from the given client data stream in TCP packets destined for a client associated with the given client data stream; and forwarding the TCP packets to the destined client over the TCP connection for the client.

43. The proxy server apparatus of clause 41 or 42, further comprising means for allocating a respective set of queues in a memory space of the memory for each of the TCP connections used to connect the plurality of clients to the proxy server, wherein the respective set of queues for a given TCP connection includes at least one output queue in which TCP packets that are to forwarded to the web server via the multiplexed TCP connection are buffered.

44. The proxy server apparatus of clause 43, further comprising means for:

allocating a respective bandwidth slice of the multiplexed TCP connection for each of the TCP connections; and implementing a queue selection algorithm that selects output queues to pull data segments from in accordance with the bandwidth slices allocated for the TCP connections.

45. The proxy server apparatus of any of clauses 41-44, further comprising means for:

receiving one of a throttle command and pause command from the web server identifying a TCP connection; and in response one of throttling and pausing a client data stream associated with the TCP connection that is transported over the multiplexed TCP connection.

As discussed above, various aspects of the embodiments herein may be facilitated by corresponding software and/or firmware components and applications, such as software and/or firmware executed by a server processor or the like. Thus, embodiments of this invention may be used as or to support a software program, software modules, firmware, and/or distributed software executed upon some form of processor, processing core or embedded logic, or on a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the Figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n', in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    establishing, at a proxy server, a plurality of TCP connections with a plurality of clients, each TCP connection connecting a client with the proxy server using a TCP port;
    coupling the proxy server in communication with a web server via a multiplexed TCP connection;
    receiving incoming TCP communications at the proxy server originating from the plurality of clients, each incoming TCP communication including at least one TCP packet including packet payload data;
    buffering the packet payload data contained in TCP packets received over a given TCP connection in a respective client data stream;
    encapsulating, at the proxy server, data segments comprising sequential runs of bits in the client data streams into multiplexed (MUX) TCP packets, each MUX TCP packet comprising a TCP packet, wherein each of at least a portion of the MUX TCP packets encapsulates data segments from at least two separate client data streams;
    transporting the MUX TCP packets from the proxy server to the web server over the multiplexed TCP connection; and
    at the web server,
        de-encapsulating data segments in the MUX TCP packets and reassembling the client data streams; and
        extracting packet payload data from the reassembled client data streams.

2. The method of claim 1, wherein the one or more TCP packets received over a first TCP connection comprise a HyperText Transport Protocol (HTTP) request sent from a first client, the method further comprising returning an HTTP response to the first client by:
    embedding the HTTP response in a client data stream destined for the first client;
    encapsulating data segments comprising sequential runs of bits corresponding to the client data stream in one or more MUX TCP packets;
    transporting the one or more MUX TCP packets from the web server to the proxy server over the multiplexed TCP connection;
    de-encapsulating the data segments from the MUX TCP packet;
    re-assembling the client data stream; and
    extracting the HTTP response and encapsulating the HTTP response in one or more TCP packets that are forwarded from the proxy server to the destined client over the first TCP connection.

3. The method of claim 1, further comprising:
    for each TCP connection,
        allocating at least one queue on the proxy server for the TCP connection; and
        buffering a client data streams comprising packet payload data contained in TCP packets received over the TCP connection in the at least one queue allocated for the TCP connection.

4. The method of claim 3, wherein the at least one queue on the proxy server allocated for each TCP connection includes an output queue, the method further comprising:
    buffering a client data stream comprising sequential runs of packet payload data contained in TCP packets transferred over the TCP connection in the output queues on the proxy server; wherein each output queue is allocated for a respective TCP connection;
    generating a stream of MUX TCP packets to be transported to the web server via the multiplexed TCP connection by using a queue selector to select output queues to pull data segments from to be encapsulated in respective MUX TCP packets in the stream of MUX TCP packets.

5. The method of claim 1, further comprising:
    receiving an HyperText Transport Protocol (HTTP) request sent from a new client to access a Universal Resource Locator (URL) for a website accessed via the web server;
    establishing a new TCP connection between the new client and the proxy server; and
    allocating queues on each of the proxy server and the web server to support forwarding of HTTP requests received at the proxy server from the new client to the web server via the multiplexed TCP connection, and for forwarding HTTP responses generated at the web server to the new client via the multiplexed TCP connection to the proxy server and the new TCP connection,
    wherein the queues that are allocated on the proxy server and the web server are dedicated for use for the HTTP requests and responses for the new client.

6. The method of claim 1, wherein the multiplexed TCP connection has an overall bandwidth, the method further comprising:

allocating a respective bandwidth slice of the overall bandwidth of the multiplexed TCP connection for each TCP connection established with the proxy server and for which TCP packets are to be forwarded over the multiplexed TCP connection; and enabling the bandwidth slice allocated for an individual TCP connection to be dynamically adjusted.

7. The method of claim 1, further comprising:

enabling at least one of the web server and proxy server to manage a rate of transfer of data for individual TCP connections that are forwarded over the multiplexed TCP connection.

8. The method of claim 7, further comprising:

enabling at least one of the web server and proxy server to pause traffic corresponding to a selected TCP connection from being forwarded over the multiplexed TCP connection.

9. The method of claim 8, wherein the web server sends a request to the proxy server to pause traffic for a given TCP connection, the method further comprising:

continuing to buffer incoming TCP traffic received from a client over the TCP connection;

receiving an indication that the traffic for the TCP connection is permitted to resume; and resume sending of data segments corresponding to TCP traffic that has accumulated in the buffer from the proxy server to the web server.

10. The method of claim 1, further comprising:

sending information from the web server to the proxy server identifying a maximum number of simultaneous data streams that may be multiplexed and sent over the multiplexed TCP connection;

establishing a number of client connections corresponding to the maximum number of simultaneous data streams;

receiving, at the proxy server, data from a new client that desires to communicate with the web server;

buffering the data from the new client; and in response to determining an existing client is done communicating with the server, negotiating a new client connection with the web server for the new client.

11. A web server apparatus, comprising:

a processor;

memory, operatively coupled to the processor;

a network adapter including at least one network port, operatively coupled to the processor; and a storage device having instructions stored therein comprising a plurality of software instructions that are configured to be executed by the processor to enable the web server apparatus to, establish a multiplexed TCP connection between a proxy server and the web server, the multiplexed TCP connection configured to transport data over a forwarding path including a link coupled to a network port on the network adaptor, wherein a plurality of clients are connected to the proxy server via respective TCP connections; and send client data stream data destined for the plurality of clients to the proxy server over the multiplexed TCP connection as a stream of multiplexed (MUX) TCP packets, each MUX TCP packet comprising a TCP packet encapsulating one or more data segments comprising sequential runs of bits from one or more client data streams comprising packet payload data to be encapsulated in TCP packets to be forwarded via the proxy server to a client over the TCP connection between the proxy server and the client, wherein each of at least a portion of the MUX TCP packets encapsulates data segments for at least two separate client data streams.

12. The web server apparatus of claim 11, wherein the plurality of software instructions are further configured to enable the web server apparatus to:

receive a stream of MUX TCP packets over the multiplexed TCP connection from the proxy server, wherein each MUX TCP packet encapsulates one or more data segments, and each data segment comprises a portion of client data stream received from a TCP client;

de-encapsulate data segments in the MUX TCP packets and reassemble the client data streams; and extract packet payload data from the reassembled client data streams.

13. The web server apparatus of claim 12, wherein the plurality of software instructions are further configured to enable the web server apparatus to:

allocate a respective set of queues in a memory space of the memory for each of the TCP connections used to connect the plurality of clients to the proxy server, wherein the respective set of queues for a given TCP connection includes at least one output queue and at least one input queue.

14. The web server apparatus of claim 11, wherein each TCP connection and the queues in the set of queues allocated for the connection are identified by a unique client identifier.

15. The web server apparatus of claim 11, wherein the plurality of instructions include a software processing stack, and wherein the plurality of software instructions are further configured to enable the web server apparatus to:

enqueue client data streams generated by the software processing stack in a plurality of output queues, wherein data contained in the client data streams enqueued for each output queue are destined for a single client;

generate a stream of MUX TCP packets by using a queue selector to select output queues to pull data segments from to be encapsulated in respective MUX TCP packets in the stream of MUX TCP packets.

16. The web server apparatus of claim 15, wherein the plurality of software instructions are further configured to enable the web server apparatus to:

allocate a respective bandwidth slice of the multiplexed TCP connection for each of the TCP connections; and implement a queue selection algorithm that selects output queues to pull data segments from in accordance with the bandwidth slices allocated for the TCP connections.

17. The web server apparatus of claim 16, wherein the plurality of software instructions are further configured to enable the web server apparatus to:

at least one of throttle or pause client data streams transported via the multiplexed TCP connection and associated with selected TCP connections on an individual basis.

18. A proxy server apparatus, configured to operate as a proxy server for a web server, comprising:

a processor;

memory, operatively coupled to the processor;

a plurality of network ports, operatively coupled to the processor; and a storage device having instructions stored therein comprising a plurality of software instructions that are configured to be executed by the processor to enable the proxy server apparatus to, establish, at a first network port, a plurality of TCP connections with respective clients;
establish a multiplexed TCP connection between the proxy server and the web server, the multiplexed TCP connection configured to transport data over a forwarding path including a link coupled to a second network port on the proxy server apparatus;
receive TCP packets from the plurality of clients over the plurality of TCP connections;
identify TCP packets that are to be proxied via the proxy server apparatus to the web server;
buffer data contained in TCP packets that are to be proxied via the proxy server apparatus and that are received over a given TCP connection in a respective client data stream;
encapsulate data segments comprising sequential runs of the client data streams in multiplexed (MUX) TCP packets comprising TCP packets, wherein each of at least a portion of the MUX TCP packets encapsulates data segments comprising sequential runs of at least two separate client data streams; and
send the MUX TCP packets outbound from the second network port to be forwarded to the web server over the multiplexed TCP connection.

19. The proxy server apparatus of claim 18, wherein the plurality of software instructions are further configured to enable the proxy server apparatus to:
receive a stream of MUX TCP packets over the multiplexed TCP connection from the web server, each MUX TCP packet encapsulating one or more data segments comprising sequential runs of bits in one or more client data streams;
de-encapsulate the one or more data segments encapsulated in the MUX TCP packets;
re-assemble the client data streams;
identify a TCP connection associated with a given client data stream;
encapsulate packet payload data extracted from the given client data stream in TCP packets destined for a client associated with the given client data stream; and
forward the TCP packets to the destined client over the TCP connection for the client.

20. The proxy server apparatus of claim 18, wherein the plurality of software instructions are further configured to enable the proxy server apparatus to:
allocate a respective set of queues in a memory space of the memory for each of the TCP connections used to connect the plurality of clients to the proxy server, wherein the respective set of queues for a given TCP connection includes at least one output queue in which TCP packets that are to forwarded to the web server via the multiplexed TCP connection are buffered.

21. The proxy server apparatus of claim 20, wherein the plurality of software instructions are further configured to enable the proxy server apparatus to:
allocate a respective bandwidth slice of the multiplexed TCP connection for each of the TCP connections; and
implement a queue selection algorithm that selects output queues to pull data segments from in accordance with the bandwidth slices allocated for the TCP connections.

22. The proxy server apparatus of claim 18, wherein the plurality of software instructions are further configured to enable the proxy server apparatus to:
receive one of a throttle command and pause command from the web server identifying a TCP connection; and
in response one of throttle and pause a client data stream associated with the TCP connection that is transported over the multiplexed TCP connection.

23. At least one non-transitory machine-readable medium having instructions stored thereon comprising a plurality of software instructions configured to be executed on a proxy server and web server to enable the proxy server and web server to:
establish, at a proxy server, a plurality of TCP connections with a plurality of clients, each TCP connection connecting a client with the proxy server using a TCP port;
couple the proxy server in communication with the web server via a multiplexed TCP connection;
receive incoming TCP communications at the proxy server originating from the plurality of clients, each incoming TCP communication including at least one TCP packet containing data comprising a HyperText Transport Protocol (HTTP) request;
extract packet payload data comprising HTTP requests from the TCP packets for a given TCP connection and add the extracted packet payload data to a client data stream;
encapsulate, at the proxy server, data segments comprising sequential runs of bits of client data streams into multiplexed (MUX) TCP packets, each MUX TCP packet comprising a TCP packet, wherein at least a portion of the MUX TCP packets encapsulate data segments from multiple client data streams;
transporting the MUX TCP packets from the proxy server to the web server over the multiplexed TCP connection; and
at the web server,
de-encapsulate data segments in the MUX TCP packets and reassembling the client data streams; and
extract HTTP requests from the reassembled client data streams.

24. The at least one non-transitory machine-readable medium of claim 23, wherein the one plurality of software instructions are further configured, upon execution, to enable the proxy server and web server to:
embed an HTTP response to an HTTP request in a client data stream destined for a client that sent the HTTP request;
encapsulate one or more data segments corresponding to the client data stream in one or more MUX TCP packets;
transport the one or more MUX TCP packets from the web server to the proxy server over the multiplexed TCP connection;
de-encapsulate the one or more data segments encapsulated in the one or more MUX TCP packets;
re-assemble the client data stream;
identify a TCP connection associated with the client data stream;
extract the HTTP response from the re-assembled client data stream and encapsulate the HTTP response in one or more TCP packets destined for a client associated with the client data stream; and
forward the one or more TCP packets to the destined client over the TCP connection for the client.

25. The at least one non-transitory machine-readable medium of claim 24, wherein each of the one or more TCP packets in which the HTTP response is embedded have a source Internet Protocol (IP) address corresponding to an IP address for the proxy server and a destination IP address corresponding to an IP address for the destined client.

* * * * *